United States Patent
Seo et al.

(10) Patent No.: US 11,516,831 B2
(45) Date of Patent: Nov. 29, 2022

(54) DETERMINATION OF APPLICATION DELAY VALUE OF MINIMUM SCHEDULING OFFSET LIMIT

(71) Applicant: LG Electronics Inc., Seoul (KR)

(72) Inventors: Inkwon Seo, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/705,003

(22) Filed: Mar. 25, 2022

(65) Prior Publication Data
US 2022/0217748 A1    Jul. 7, 2022

Related U.S. Application Data

(63) Continuation of application No. PCT/KR2020/015141, filed on Nov. 2, 2020.

(30) Foreign Application Priority Data

Nov. 7, 2019    (KR) ........................ 10-2019-0142075

(51) Int. Cl.
*H04W 72/12*    (2009.01)
*H04L 27/26*    (2006.01)
*H04W 72/04*    (2009.01)

(52) U.S. Cl.
CPC ... *H04W 72/1268* (2013.01); *H04L 27/26025* (2021.01); *H04W 72/0446* (2013.01); *H04W 72/1289* (2013.01)

(58) Field of Classification Search
CPC ......... H04W 72/1289; H04W 72/0446; H04W 72/1268; H04L 27/2605

(Continued)

(56) References Cited

U.S. PATENT DOCUMENTS

2020/0236692 A1 *   7/2020  Lin ........................ H04L 5/0007
2021/0050985 A1 *   2/2021  Ang ....................... H04L 5/0091

FOREIGN PATENT DOCUMENTS

WO    WO2018175805         9/2018
WO    WO-2021255712 A1 *  12/2021

OTHER PUBLICATIONS

Huawei & HiSilicon, "Procedure of cross-slot scheduling for UE power saving," R1-1910077, Presented at 3GPP TSG RAN WG1 Meeting #98bis, Chongqing, China, Oct. 14-20, 2019, 12 pages.

(Continued)

*Primary Examiner* — Peter G Solinsky
(74) *Attorney, Agent, or Firm* — Fish & Richardson P.C.

(57) ABSTRACT

Provided are a method and device for determining an application delay value of a minimum scheduling offset limit in a wireless communication system. In the method, when DCI including information notifying a change in a minimum scheduling offset limit value in slot n of a scheduling cell is received, the changed minimum scheduling offset limit value is applied in slot n+X of the scheduling cell. Here, the X value may be determined on the basis of two parameters such as Y and Z, wherein the Y value is a minimum scheduling offset limit value applied to a scheduled cell scheduled by the DCI, and the Z value is a value determined in advance according to a subcarrier interval of the scheduling cell. In addition, the Z value may be increased by 1 according to the temporal position at which the DCI is received in the slot n.

15 Claims, 31 Drawing Sheets

(58) Field of Classification Search
USPC .......................................................... 370/329
See application file for complete search history.

(56) References Cited

OTHER PUBLICATIONS

Motorola Mobility & Lenovo, "Cross-slot scheduling for power saving," RI-1911031, Presented at 3GPP TSG RAN WG1 #98bis, Chongqing, China, Oct. 14-20, 2019, 8 pages.

NTT DOCOMO, Inc., "Discussion on procedure of cross-slot scheduling power saving techniques," R1-1911189, Presented at 3GPP TSG RAN WG1 #98bis, Chongqing, China, Oct. 14-20, 2019, 2 pages.

Oppo, "Further considerations on cross-slot scheduling for power saving," R1-1910385, Presented at 3GPP TSG RAN WG1 #98bis, Chongqing, China, Oct. 14-20, 2019, 7 pages.

* cited by examiner

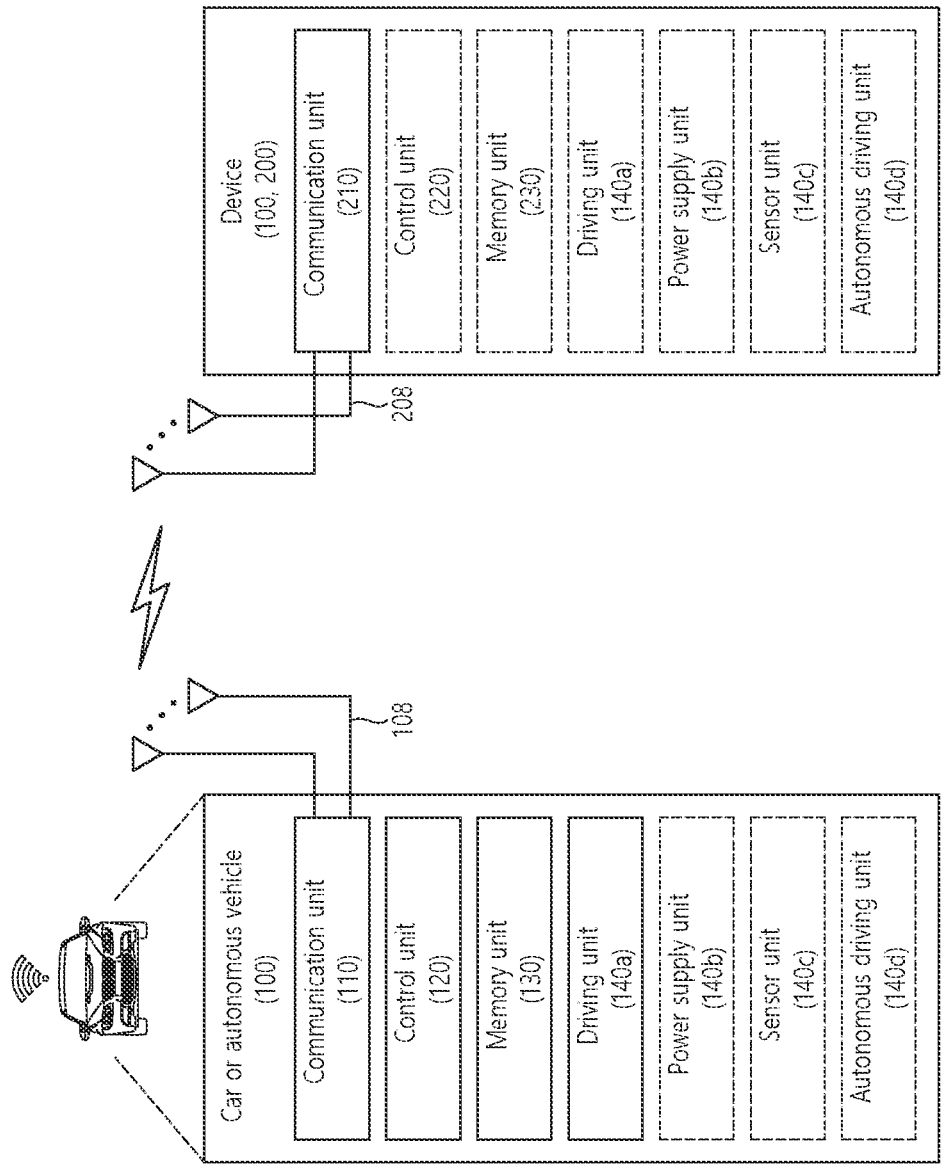

11,516,831 B2

DETERMINATION OF APPLICATION DELAY VALUE OF MINIMUM SCHEDULING OFFSET LIMIT

CROSS-REFERENCE TO RELATED APPLICATIONS

Pursuant to 35 U.S.C. § 119(e), this application is a continuation of International Application No. PCT/KR2020/015141, with an international filing date of Nov. 2, 2020, which claims the benefit of Korean Patent Application No. 10-2019-0142075, filed on Nov. 7, 2019, the contents of which are hereby incorporated by reference herein in their entirety.

BACKGROUNDS

Field of the Description

The present disclosure relates to a method for determining an application delay value of a minimum scheduling offset restriction in a wireless communication system and an apparatus using the method.

Related Art

As a growing number of communication devices require higher communication capacity, there is a need for advanced mobile broadband communication as compared to existing radio access technology (RAT). Massive machine-type communication (MTC), which provides a variety of services anytime and anywhere by connecting a plurality of devices and a plurality of objects, is also one major issue to be considered in next-generation communication. In addition, designs for communication systems considering services or a user equipment (UE) sensitive to reliability and latency are under discussion. Introduction of next-generation RAT considering enhanced mobile broadband communication, massive MTC, and ultra-reliable and low-latency communication (URLLC) is under discussion. In this disclosure, for convenience of description, this technology may be referred to as new RAT or new radio (NR). NR is also referred to as a fifth generation (5G) system.

As the performance and functions of the UE such as display resolution, display size, processor, memory, and application increase of the UE improve, power consumption also increases. Since the power supply of the UE may be limited to the battery, it is important to reduce power consumption. This is the same for a UE operating in NR.

As one example for reducing power consumption of the UE, there is cross-slot scheduling. A slot in which a physical downlink control channel (PDCCH) is received is the same as a slot in which a physical downlink shared channel (PDSCH) scheduled by the PDCCH is received is called same-slot scheduling. In cross-slot scheduling, the PDCCH and the PDSCH scheduled by the PDCCH may be in different slots. The PDCCH is often received only in some symbols within the slot (e.g., the first 3 symbols of the slot) and decoded. When cross-slot scheduling is applied, the UE can save power by making a radio frequency (RF) unit sleep in symbols (slots) after receiving the PDCCH before receiving the PDSCH.

The network sets the minimum applicable K0/K2 value, and may indicate to the UE the minimum applicable slot offset between the PDCCH (more specifically, downlink control information (DCI)) and the PDSCH/PUSCH (physical uplink shared channel) scheduled by the DCI. The minimum applicable slot offset means a minimum value of an offset between a slot in which DCI is received and a PDSCH/PUSCH slot scheduled by the DCI, and may be referred to as a minimum scheduling offset.

By the way, upon indicating/changing the minimum scheduling offset, when the indication/change is applied may be defined through an 'application delay' value.

When cross-carrier scheduling, particularly, cross-carrier scheduling is used in carrier aggregation in which the numerology of the scheduling cell and the scheduled cell are different, it is necessary to clearly define how to determine the application delay value.

SUMMARY

A technical object of the disclosure is to provide a method for determining an application delay value of a minimum scheduling offset restriction in a wireless communication system and an apparatus using the method.

In one aspect, provided is a method for determining an application delay value of a minimum scheduling offset restriction in a wireless communication system. The method includes receiving downlink control information (DCI) including information for a change to a value of K0 min or K2 min in a slot n of a scheduling cell, each of the K0 min and K2 min being an applied minimum scheduling offset restriction, and applying a changed K0 min or a changed K2 min value in a slot n+X of the scheduling cell. The X value is a largest value among i) a first value obtained by multiplying currently applied K0 min (Y) in a scheduled cell scheduled by the DCI by $2^{\mu scheduling}/2^{\mu scheduled}$ and then performing ceiling and ii) a second value (Z) that are predetermined depending on a subcarrier spacing (SCS) of the scheduling cell. The $\mu$scheduling is a subcarrier spacing configuration of the scheduling cell and the $\mu$scheduled is a subcarrier spacing configuration of the scheduled cell.

In another aspect, provided is a user equipment (UE). The UE includes a transceiver for transmitting and receiving a radio signal and a processor operating in connected to the transceiver. The processor is configured to: receive downlink control information (DCI) including information for a change to a value of K0 min or K2 min in a slot n of a scheduling cell, each of the K0 min and K2 min being an applied minimum scheduling offset restriction, and apply a changed K0 min or a changed K2 min value in a slot n+X of the scheduling cell. The X value is a largest value among i) a first value obtained by multiplying currently applied K0 min (Y) in a scheduled cell scheduled by the DCI by $2^{\mu scheduling}/2^{\mu scheduled}$ and then performing ceiling and ii) a second value (Z) that are predetermined depending on a subcarrier spacing (SCS) of the scheduling cell. The $\mu$scheduling is a subcarrier spacing configuration of the scheduling cell and the $\mu$scheduled is a subcarrier spacing configuration of the scheduled cell.

In still another aspect, provided is a communication method of a base station to which an application delay value of a minimum scheduling offset restriction is applied in a wireless communication system. The method includes transmitting, to a user equipment, downlink control information (DCI) including information for a change to a value of K0 min or K2 min in a slot n of a scheduling cell, each of the K0 min and K2 min being an applied minimum scheduling offset restriction, and communicating with the user equipment by applying a changed K0 min or a changed K2 min value in a slot n+X of the scheduling cell. The X value is a largest value among i) a first value obtained by multiplying currently applied K0 min (Y) in a scheduled cell scheduled by the DCI by $2^{\mu scheduling}/2^{\mu scheduled}$ and then performing ceiling and ii) a second value (Z) that are predetermined depending on a subcarrier spacing (SCS) of the scheduling cell. The μscheduling is a subcarrier spacing configuration of the scheduling cell and the μscheduled is a subcarrier spacing configuration of the scheduled cell.

In still another aspect, provided is a base station. The base station comprises a transceiver for transmitting and receiving a radio signal and a processor operating in connected to the transceiver. The processor is configured to: transmit, to a user equipment, downlink control information (DCI) including information for a change to a value of K0 min or K2 min in a slot n of a scheduling cell, each of the K0 min and K2 min being an applied minimum scheduling offset restriction, and communicate with the user equipment by applying a changed K0 min or a changed K2 min value in a slot n+X of the scheduling cell. The X value is a largest value among i) a first value obtained by multiplying currently applied K0 min (Y) in a scheduled cell scheduled by the DCI by $2^{\mu scheduling}/2^{\mu scheduled}$ and then performing ceiling and ii) a second value (Z) that are predetermined depending on a subcarrier spacing (SCS) of the scheduling cell. The μscheduling is a subcarrier spacing configuration of the scheduling cell and the μscheduled is a subcarrier spacing configuration of the scheduled cell.

In still another aspect, provided is at least one computer-readable medium (CRM) comprising an instruction based on being executed by at least one processor. The CRM receives downlink control information (DCI) including information for a change to a value of K0 min or K2 min in a slot n of a scheduling cell, each of the K0 min and K2 min being an applied minimum scheduling offset restriction, and applies a changed K0 min or a changed K2 min value in a slot n+X of the scheduling cell. The X value is a largest value among i) a first value obtained by multiplying currently applied K0 min (Y) in a scheduled cell scheduled by the DCI by $2^{\mu scheduling}/2^{\mu scheduled}$ and then performing ceiling and ii) a second value (Z) that are predetermined depending on a subcarrier spacing (SCS) of the scheduling cell. The μscheduling is a subcarrier spacing configuration of the scheduling cell and the μscheduled is a subcarrier spacing configuration of the scheduled cell.

In still another aspect, provided is an apparatus operated in a wireless communication system. The apparatus includes a processor and a memory to be operatively connected to the processor. The processor is configured to: receive downlink control information (DCI) including information for a change to a value of K0 min or K2 min in a slot n of a scheduling cell, each of the K0 min and K2 min being an applied minimum scheduling offset restriction, and apply a changed K0 min or a changed K2 min value in a slot n+X of the scheduling cell. The X value is a largest value among i) a first value obtained by multiplying currently applied K0 min (Y) in a scheduled cell scheduled by the DCI by $2^{\mu scheduling}/2^{\mu scheduled}$ and then performing ceiling and ii) a second value (Z) that are predetermined depending on a subcarrier spacing (SCS) of the scheduling cell. The μscheduling is a subcarrier spacing configuration of the scheduling cell and the μscheduled is a subcarrier spacing configuration of the scheduled cell.

When a change in the minimum scheduling offset is indicated in carrier aggregation using different numerologies (e.g., different subcarrier spacing) in the scheduling cell and the scheduled cell, misunderstandings do not occur between the network and the UE by clarifying the application delay value indicating the time of application of the change. In addition, it prevents an impossible or difficult UE operation from occurring by determining the application delay value in consideration of the position in the slot of the DCI indicating the change.

BRIEF DESCRIPTION OF THE DRAWINGS

FIG. 31 illustrates a vehicle or autonomous driving vehicle that may be applied herein.

DESCRIPTION OF EXEMPLARY EMBODIMENTS

Figure 1:
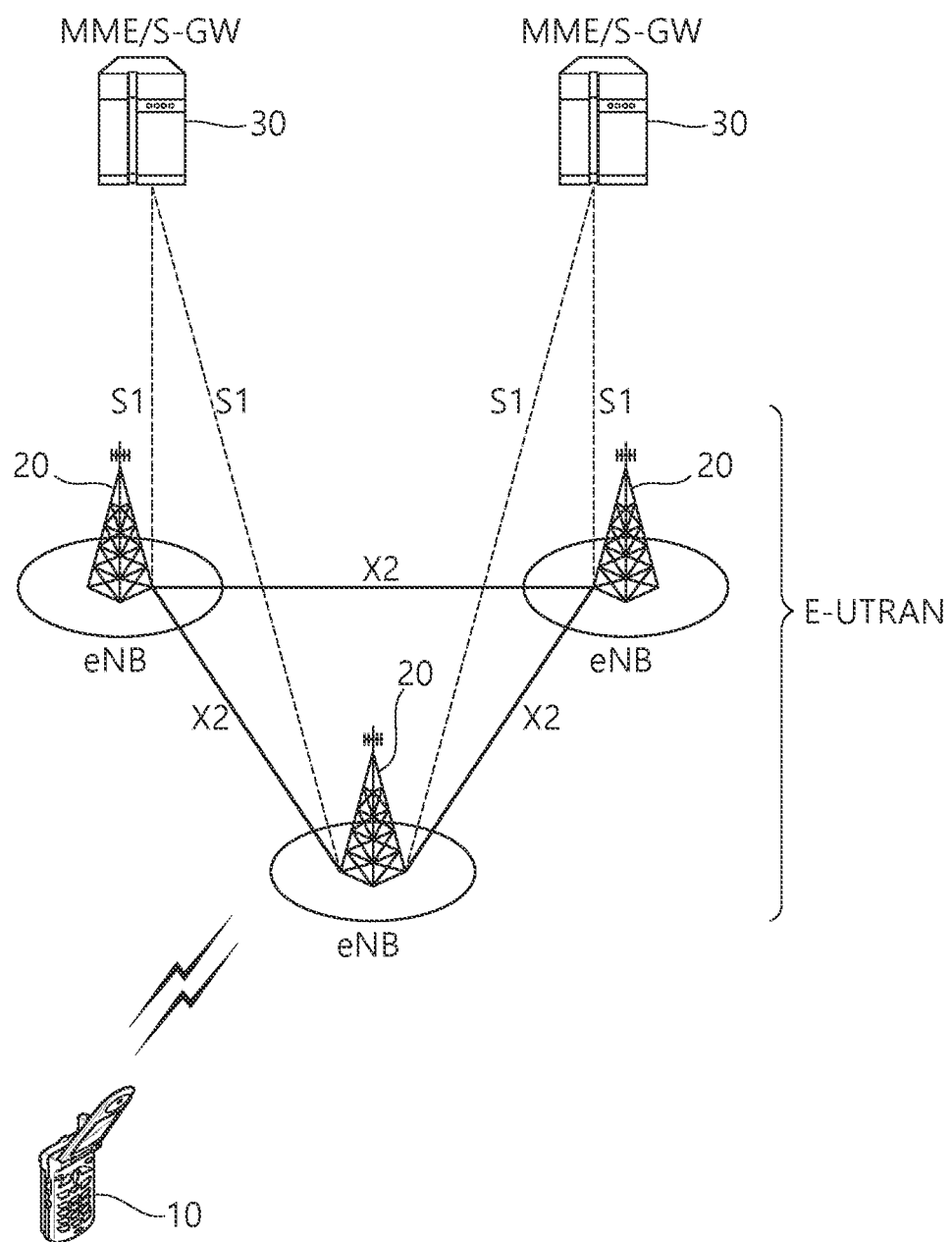
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, terminal, etc. The BS 20 is generally a fixed station that communicates with the UE 10 and may be referred to as another terminology, such as an evolved node-B (eNB), a base transceiver system (BTS), an access point, gNB, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
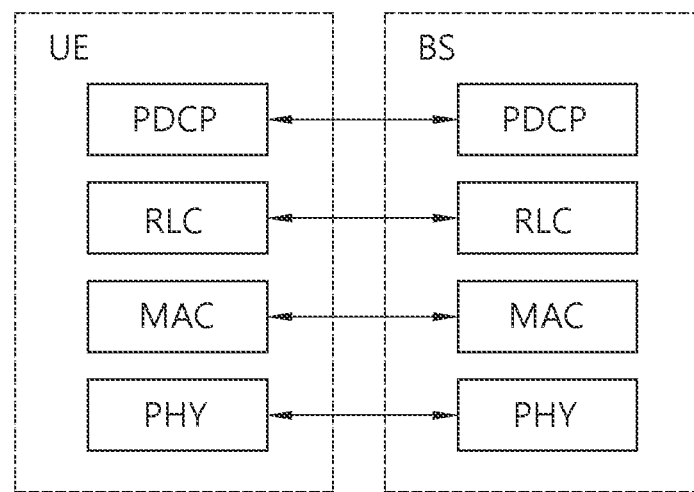
FIG. 2 is a diagram showing a wireless protocol architecture for a user plane.
Figure 3:
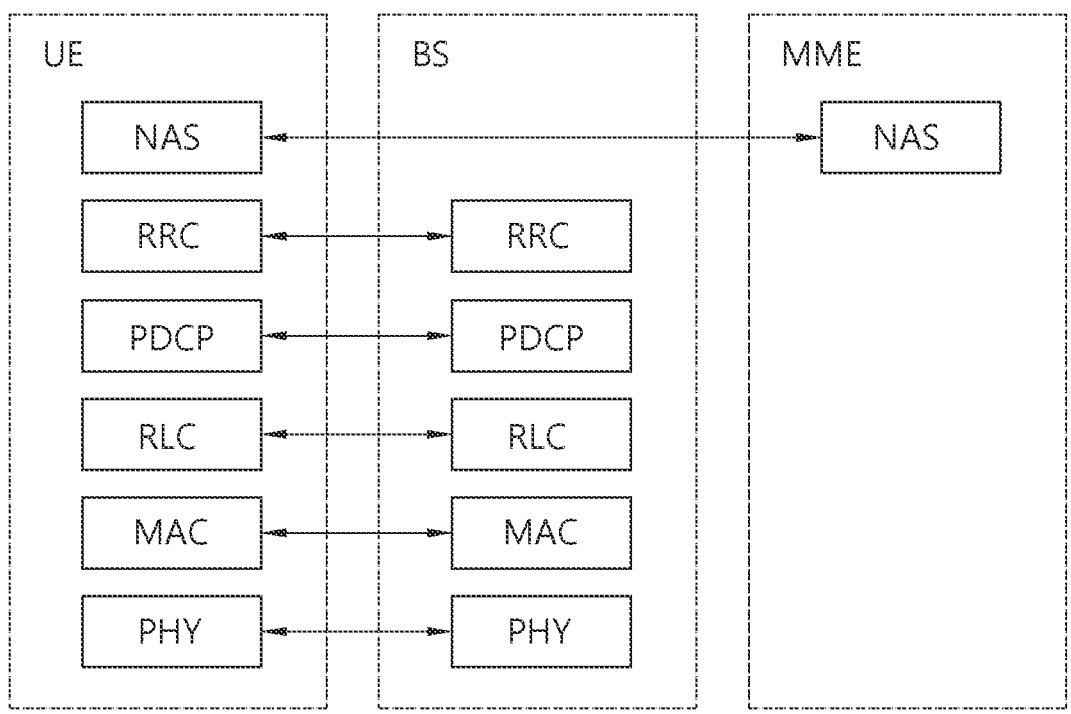
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
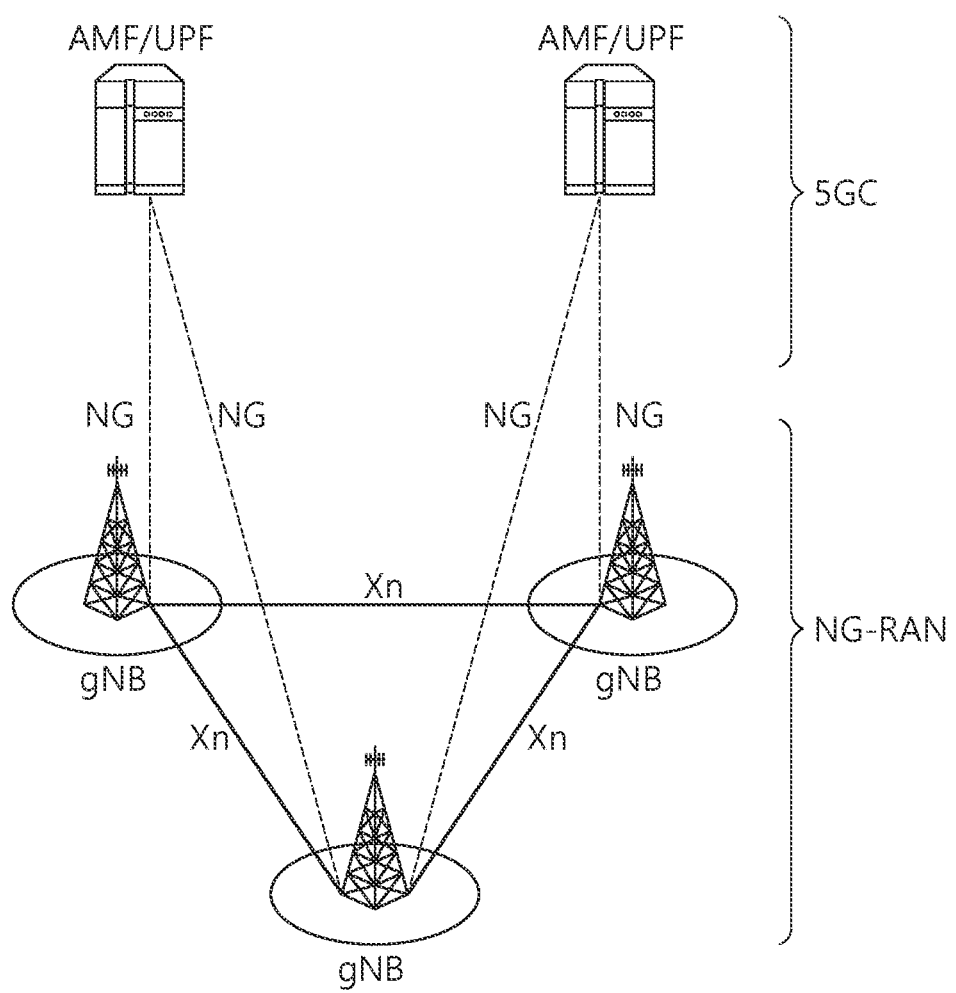
FIG. 4 shows another example of a wireless communication system to which the present disclosure may be applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a UE. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
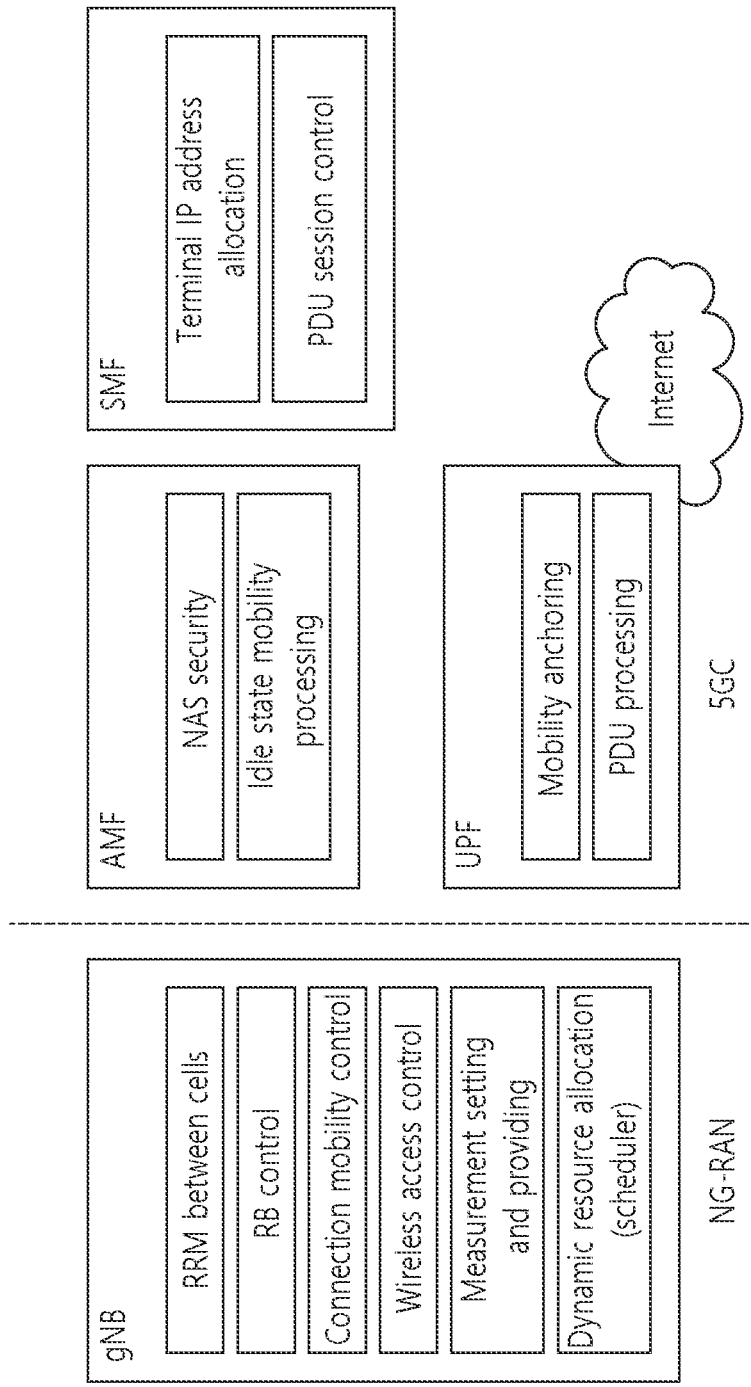
FIG. 5 illustrates a functional division between an NG-RAN and a 5GC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
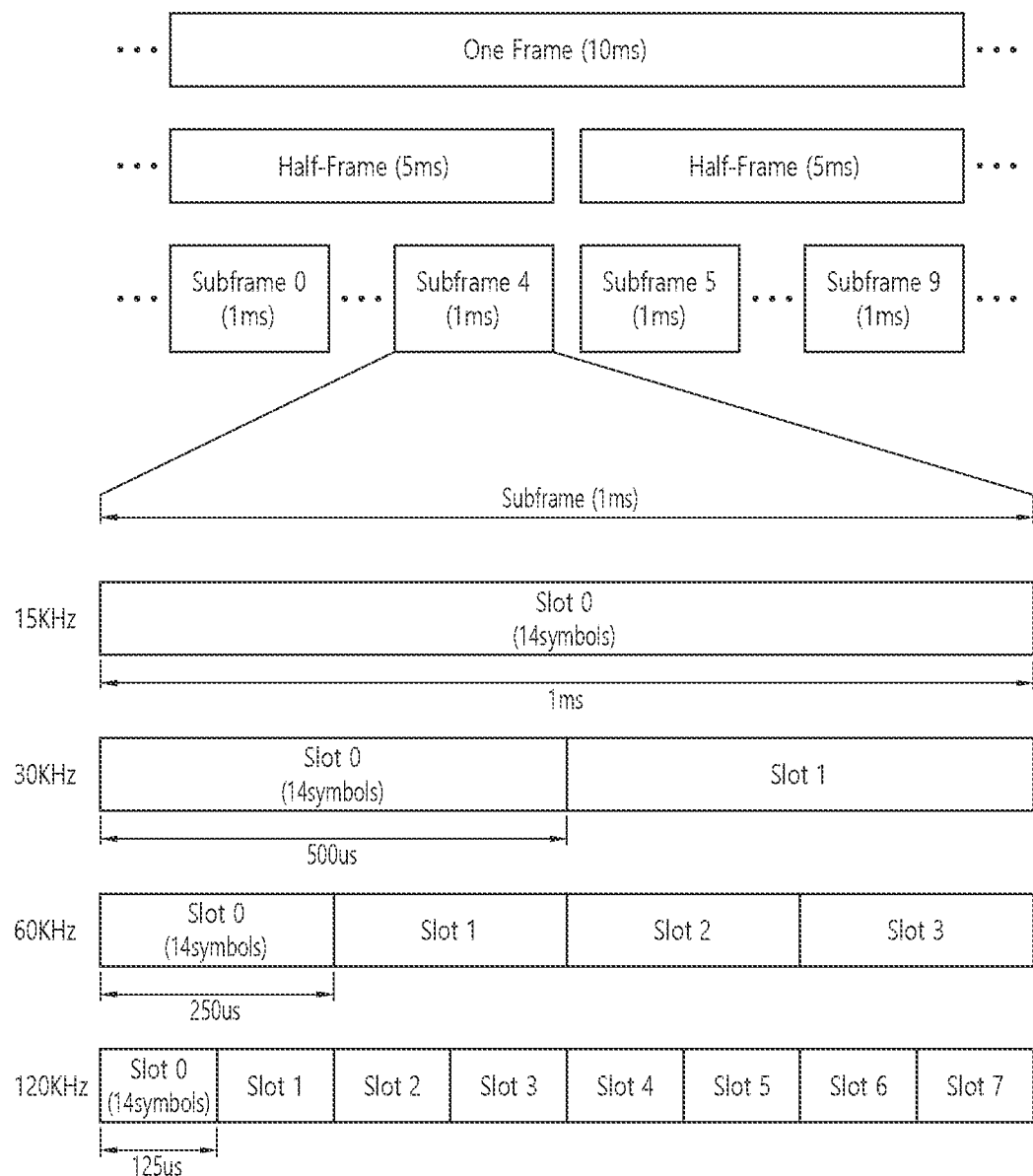
FIG. 6 illustrates an example of a frame structure that may be applied in NR.

FIG. 6 illustrates an example of a frame structure that may be applied in NR.

Referring to FIG. 6, a radio frame (which may be called as a frame hereinafter) may be used for uplink and downlink transmission in NR. A frame has a length of 10 ms and may be defined as two 5 ms half-frames (Half-Frame, HF). A half-frame may be defined as five 1 ms subframes (Subframe, SF). A subframe may be divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbol may include an OFDM symbol (or a CP-OFDM symbol) and an SC-FDMA symbol (or a DFT-s-OFDM symbol).

The following table 1 illustrates a subcarrier spacing configuration μ.

TABLE 1

| μ | $\Delta f = 2^\mu \cdot 15$[kHz] | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, μ=0, 1, 2, and 3 are exemplified.

Table 2-1 below exemplifies that the number of symbols per slot, the number of slots per frame, and the number of slots per subframe vary according to SCS (μ=2, 60 kHz) when the extended CP is used.

TABLE 2-1

| μ | $N^{slot}_{symb}$ | $N^{frame,\mu}_{slot}$ | $N^{subframe,\mu}_{slot}$ |
|---|---|---|---|
| 2 | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
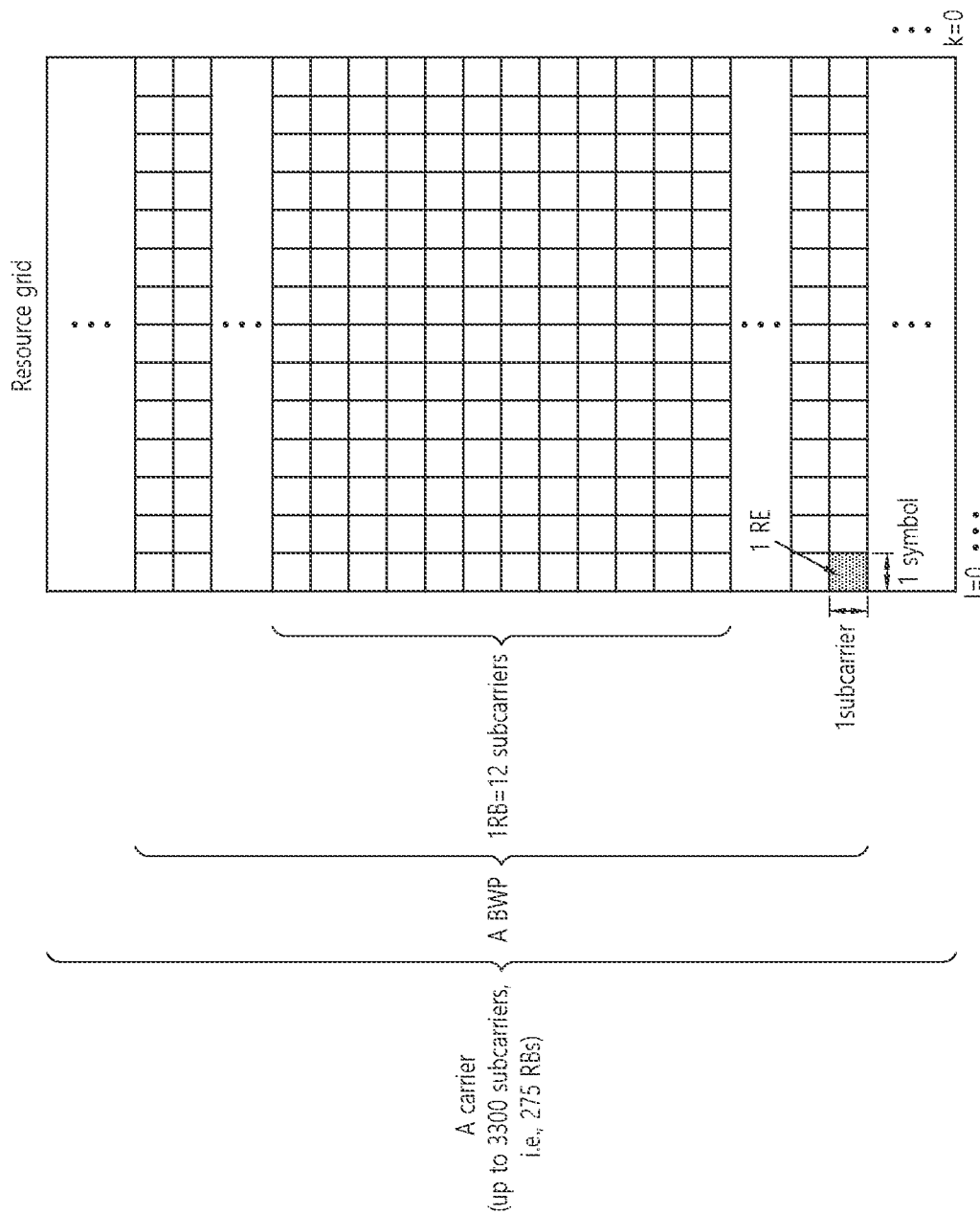
FIG. 7 illustrates a slot structure of the NR frame.

FIG. 7 illustrates a slot structure of a NR frame.

A slot may comprise a plurality of symbols in a time domain. For example, in case of a normal CP, one slot may include 7 symbols. However, in case of an extended CP, one slot may include 6 symbols. The carrier may include a plurality of subcarriers in a frequency domain. A resource block (RB) may be defined as a plurality of consecutive subcarriers (e.g., 12) in the frequency domain. A bandwidth part (BWP) may be defined as a plurality of consecutive (P)RBs in the frequency domain, and may correspond to one numerology (e.g., SCS, CP length, etc.). A carrier may include a maximum of N (e.g., 5) BWPs. Data communication is performed through the activated BWP, and only one BWP can be activated for one UE. Each element in the resource grid is referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring means decoding each PDCCH candidate according to a downlink control information (DCI) format. The UE monitors a set of PDCCH candidates in one or more CORESETs (described below) on the activated DL BWP of each activated serving cell for which PDCCH monitoring is configured according to a corresponding search space set.

A new unit called a control resource set (CORESET) may be introduced in the NR. The UE may receive a PDCCH in the CORESET.

Figure 8:
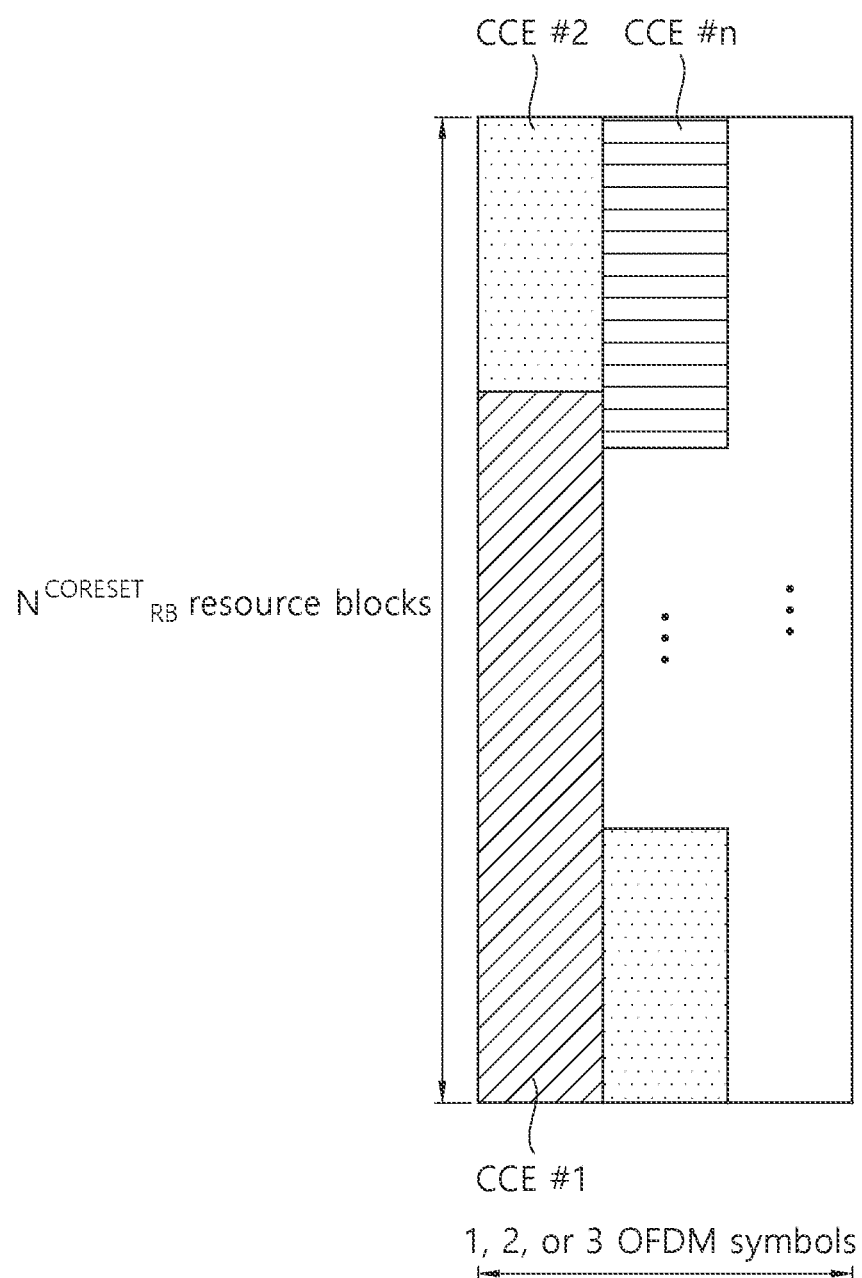
FIG. 8 illustrates a CORESET.

FIG. 8 illustrates a CORESET.

Referring to FIG. 8, the CORESET includes $N^{CORESET}_{RB}$ resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET. One CCE may be composed of a plurality of resource element groups (REGs), and one REG may include one OFDM symbol in the time domain and 12 resource elements in the frequency domain.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 9:
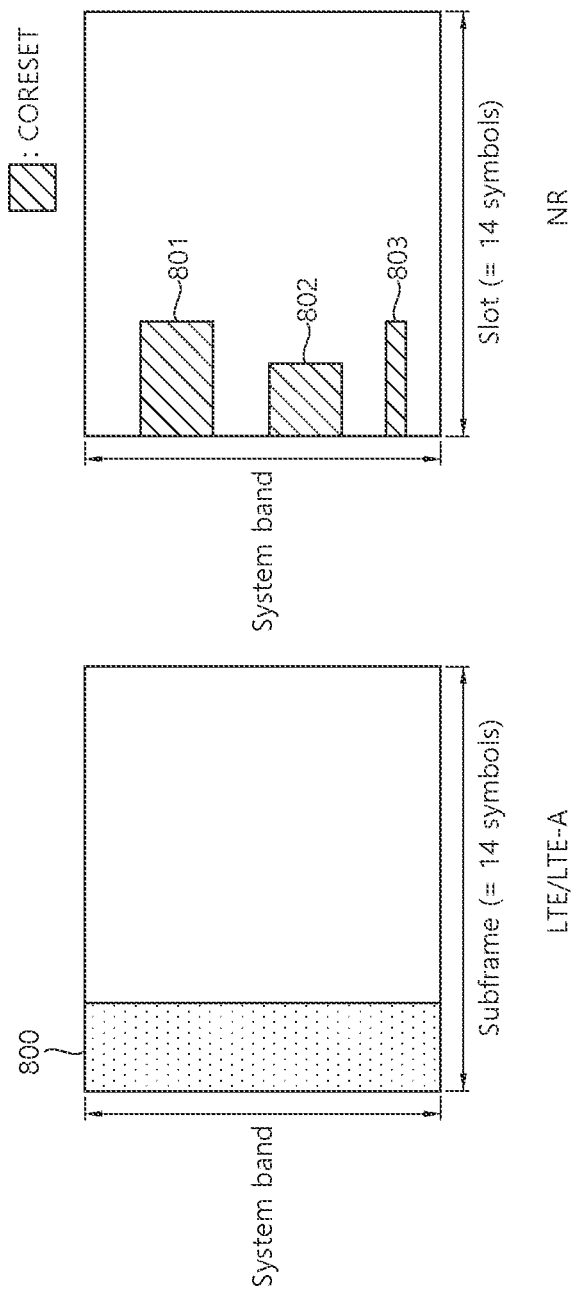
FIG. 9 is a diagram illustrating a difference between a conventional control region and the CORESET in NR.

FIG. 9 is a diagram illustrating a difference between a conventional control region and the CORESET in NR.

Referring to FIG. 9, a control region 800 in the conventional wireless communication system (e.g., LTE/LTE-A) is configured over the entire system band used by a base station (BS). All the UEs, excluding some (e.g., eMTC/NB-IoT UE) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the UE and may use only a portion, rather than the entirety of the system bandwidth in the frequency domain. In addition, in the time domain, only some of the symbols in the slot may be used. The BS may allocate the CORESET to each UE and may transmit control information through the allocated CORESET. For example, in FIG. 9, a first CORESET 801 may be allocated to UE 1, a second CORESET 802 may be allocated to UE 2, and a third CORESET 803 may be allocated to UE 3. In the NR, the UE may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 10:
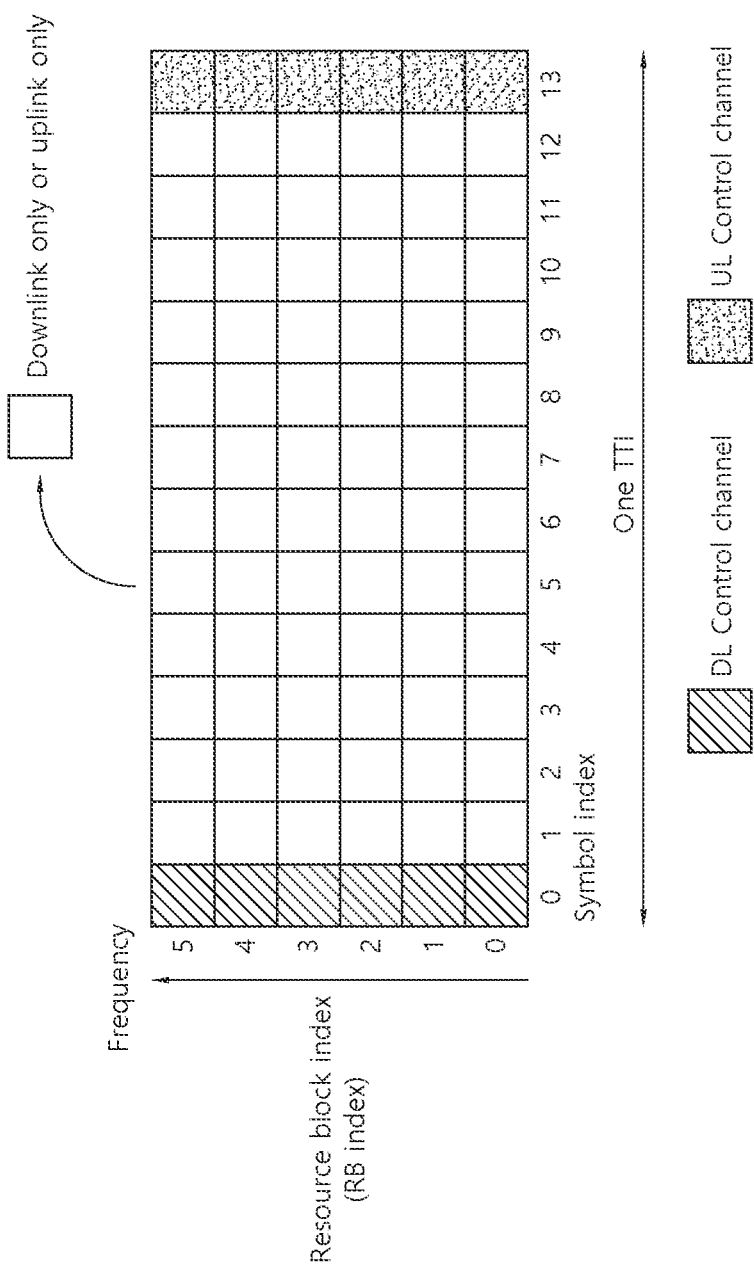
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 11:
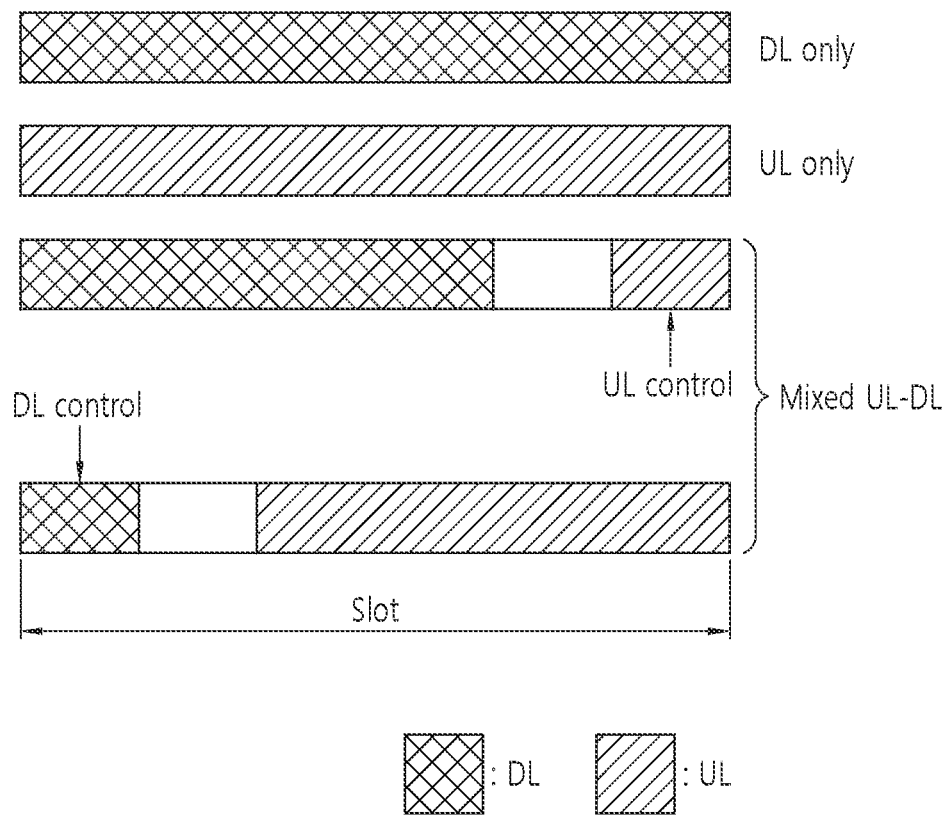
FIG. 11 illustrates a structure of self-contained slot.

FIG. 11 illustrates a structure of self-contained slot.

In NR system, one slot includes all of a DL control channel, DL or UL data channel, UL control channel, and so on. For example, the first N symbols in a slot may be used for transmitting a DL control channel (in what follows, DL control region), and the last M symbols in the slot may be used for transmitting an UL control channel (in what follows, UL control region). N and M are each an integer of 0 or larger. A resource region located between the DL and UL control regions (in what follows, a data region) may be used for transmission of DL data or UL data. As one example, one slot may correspond to one of the following configurations. Each period is listed in the time order.

1. DL only configuration
2. UL only configuration
3. Mixed UL-DL configuration

DL region+GP (Guard Period)+UL control region

DL control region+GP+UL region a DL region: (i) a DL data region, (ii) DL control region plus DL data region a UL region: (i) an UL data region, (ii) UL data region plus UL control region.

In the DL control region, a PDCCH may be transmitted, and in the DL data region, a PDSCH may be transmitted. In the UL control region, a PUCCH may be transmitted, and in the UL data region, a PUSCH may be transmitted. In the PDCCH, Downlink Control Information (DCI), for example, DL data scheduling information or UL data scheduling information may be transmitted. In the PUCCH, Uplink Control Information (UCI), for example, ACK/NACK (Positive Acknowledgement/Negative Acknowledgement) information with respect to DL data, Channel State Information (CSI) information, or Scheduling Request (SR) may be transmitted. A GP provides a time gap during a process where a gNB and a UE transition from the transmission mode to the reception mode or a process where the gNB and UE transition from the reception mode to the transmission mode. Part of symbols belonging to the occasion in which the mode is changed from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

System information of the NR system may be transmitted in a broadcasting manner. In this case, in one symbol, analog beams belonging to different antenna panels may be simultaneously transmitted. A scheme of introducing a beam RS (BRS) which is a reference signal (RS) transmitted by applying a single analog beam (corresponding to a specific antenna panel) is under discussion to measure a channel per analog beam. The BRS may be defined for a plurality of antenna ports, and each antenna port of the BRS may correspond to a single analog beam. In this case, unlike the BRS, a synchronization signal or an xPBCH may be transmitted by applying all analog beams within an analog beam group so as to be correctly received by any UE.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a primary synchronization signal (PSS), secondary synchronization signal (SSS), and a PBCH associated with demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, transmission and reception may be performed based on beams. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.

1) CORESET index p (e.g., one of 0 to 11, where index of each CORESET may be determined uniquely among BWPs of one serving cell), 2) PDCCH DM-RS scrambling sequence initialization value, 3) Duration of a CORESET in the time domain (which may be given in symbol units), 4) Resource block set, 5) CCE-to-REG mapping parameter, 6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'), 7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 4).

TABLE 4

| QCL Type | Description |
| --- | --- |
| QCL-TypeA | Doppler shift, Doppler spread, Average delay, Delay spread |
| QCL-TypeB | Doppler shift, Doppler spread |
| QCL-TypeC | Doppler shift, Average delay |
| QCL-TypeD | Spatial Rx parameter |

Each 'TCI-State' may include a parameter for configuring a QCL relation between one or two downlink reference signals and a DM-RS port of a PDSCH (or PDDCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s ($0 \le s < 40$), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 12:
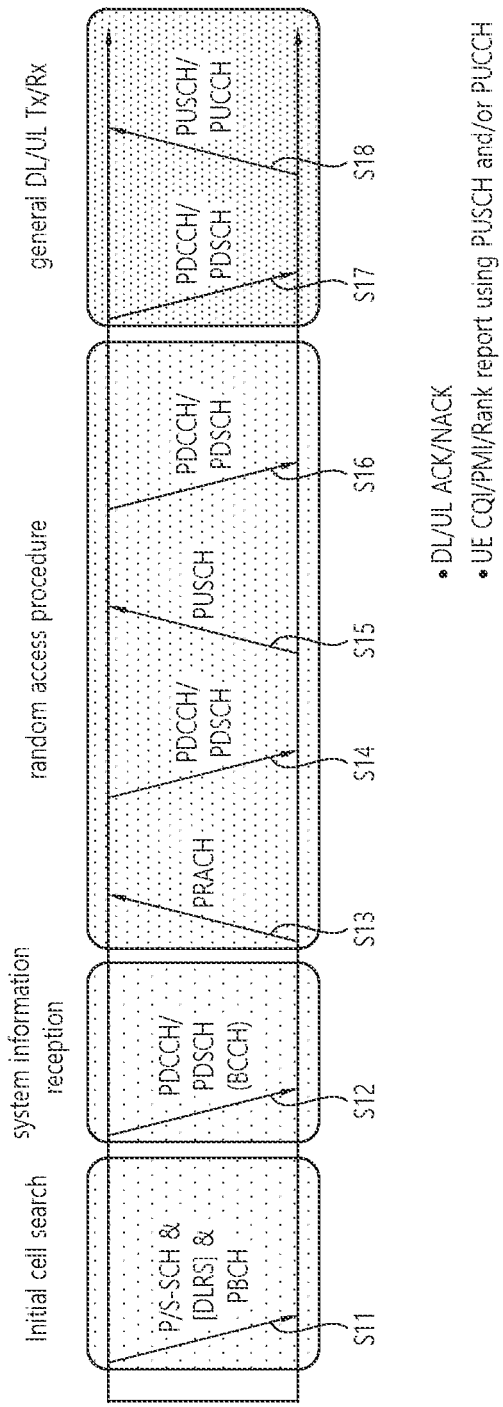
FIG. 12 illustrates physical channels and general signal transmission.

FIG. 12 illustrates physical channels and typical signal transmission.

Referring to FIG. 12, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/ physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (NACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/ instruction of a network.

In order to enable reasonable battery consumption when bandwidth adaptation (BA) is configured, only one uplink BWP and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires.

Figure 13:
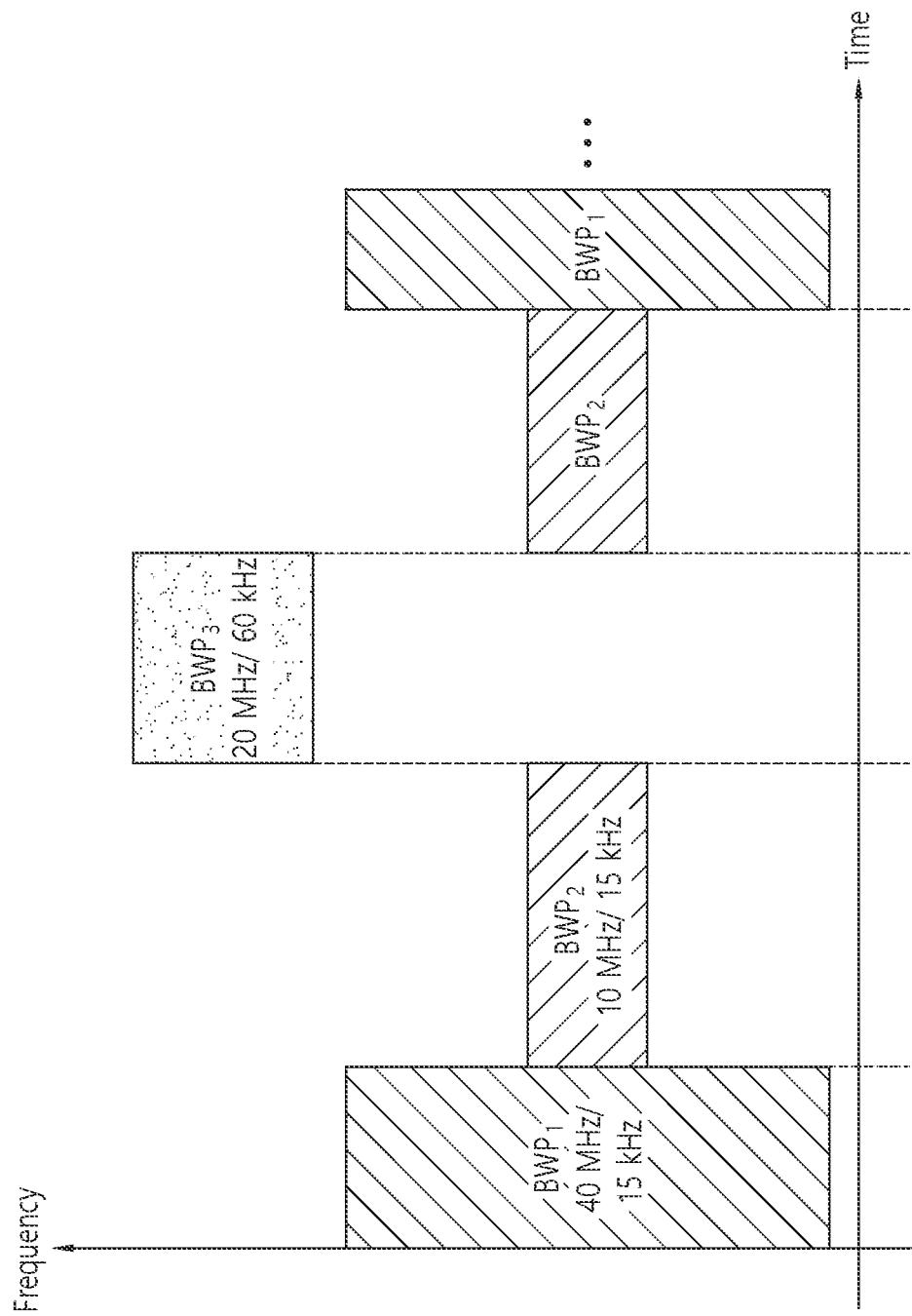
FIG. 13 illustrates a scenario in which three different bandwidth parts are set.

FIG. 13 illustrates a scenario in which three different bandwidth parts are configured.

FIG. 13 shows an example in which $BWP_1$, $BWP_2$, and $BWP_3$ are configured on a time-frequency resource. The $BWP_1$ may have a width of 40 MHz and a subcarrier spacing of 15 kHz. The $BWP_2$ may have a width of 10 MHz and a subcarrier spacing of 15 kHz. The $BWP_3$ may have a width of 20 MHz and a subcarrier spacing of 60 kHz. In other words, each BWP may have a different width and/or a different subcarrier spacing.

Hereinafter, the present disclosure proposes a cross-slot scheduling method and an apparatus using the method in a wireless communication system.

In NR, a power saving technique is being discussed to reduce the power consumption of the UE, and among the techniques, there is a power saving technique using cross-slot scheduling.

A power saving technique using cross-slot scheduling indicates a minimum slot offset between the DCI and the PDSCH scheduled in the DCI. Power consumption can be reduced by a method in which the UE (micro-) sleeps or applies PDCCH decoding relaxation (e.g., using a low voltage/low clock speed) in a duration guaranteed by the minimum slot offset. For example, assume that the minimum slot offset is 2. In this case, if the UE receives DCI in slot #N, the UE sleeps in slot #N+1 and wakes up in slot #N+2 to receive the PDSCH scheduled by the DCI. Since the minimum slot offset is 2, it is okay to sleep in slot #N+1. The minimum slot offset may be referred to as a minimum applicable slot offset or a minimum applicable offset, a minimum scheduling offset, or the like.

As a specific example, the network may set a minimum applicable K0/K2 value to indicate to the UE the minimum slot offset between the DCI and the corresponding scheduled PDSCH/PUSCH when scheduling a PDSCH or a PUSCH. Here, K0 may be an offset (slot offset) related to a time relationship between a slot in which DCI is received and a slot in which a PDSCH scheduled by the DCI is received. K0 may be based on the numerology of the PDSCH. K2 may be an offset (slot offset) related to a time relationship between a slot in which DCI is received and a slot in which a PUSCH scheduled by the DCI is transmitted. K2 may be based on the numerology of PUSCH. It can be seen that the minimum applicable K0 indicates the minimum applicable value (restriction) in setting the K0 value, and the minimum applicable K2 indicates the minimum applicable value (restriction) in the setting of the K2 value. Hereinafter, the minimum applicable K0 may be expressed as K0 min, and the minimum applicable K2 may be expressed as K2 min.

For example, the base station may instruct K0 and K2 to the UE in the following manner.

When the UE is scheduled to receive the PDSCH by DCI, the time domain resource assignment field value m of DCI provides the row index m+1 in the resource allocation table. The indexed row directly defines the slot offset K0, the start and length indicator SLIV or the start symbol S and the allocation length L, and the PDSCH mapping type assumed in PDSCH reception.

The following table is an example of a resource allocation table.

TABLE 5

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |

TABLE 5-continued

| Row index | dmrs-TypeA-Position | PDSCH mapping type | $K_0$ | S | L |
|---|---|---|---|---|---|
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

Given the parameter value of the indexed row, the slot allocated to the PDSCH is $floor(n \cdot (2^{\mu_{PDSCH}}/2^{\mu_{PDCCH}}))+K0$. Here, n is a slot with a scheduling DCI, and K0 is based on the numerology of the PDSCH. Each of $\mu_{PDSCH}$ and $\mu_{PDCCH}$ is a subcarrier spacing configuration for each of PDSCH and PDCCH.

The start symbol S for the start of the slot and L (the number of symbols allocated to the PDSCH), which is the number of consecutive symbols counted from the symbol S, are determined from the 'start and length indicator' SLIV.

When the UE is scheduled to transmit a transport block but no CSI report, or when the UE is scheduled to transmit a transport block and CSI report(s) in PUSCH by DCI, the time domain resource assignment field value m of the DCI provides the row index m+1 in the allocated table. The indexed row directly defines a slot offset K2, a start and length indicator SLIV or a start symbol S and an allocation length L, and a PUSCH mapping type to be applied to PUSCH transmission.

The slot in which the UE should transmit the PUSCH may be determined, by K2, as $floor(n \cdot (2^{\mu_{PUSCH}}/2^{\mu_{PDCCH}}))+K2$. Here, n is a slot with a scheduling DCI, and K2 is based on the numerology of PUSCH. $\mu_{PUSCH}$ and $\mu_{PDCCH}$ are subcarrier spacing configurations for PUSCH and PDCCH, respectively.

The start symbol S for the start of a slot (relative to the start of the slot) and L, the number of consecutive symbols allocated to the PUSCH counted from the symbol S, is determined from the start and length indicator SLIV of the indexed row.

On the other hand, in the case of instructing/changing the minimum applicable K0/K2 (K0 min/K2 min), when the corresponding instruction/change is applied may be determined by "application delay", and the application delay may be defined as follows. Hereinafter, for convenience, the application delay may be expressed as X or the application delay X.

For the application delay X to apply the minimum applicable K0/K2 value(s) indicated for the scheduled cell, triggered by a 1-bit indication of DCI format 1_1 or 0_1 in the scheduling cell, the UE receives DCI indicating a change of the minimum applicable K0/K2 value in slot n of the scheduling cell, The UE may assume that a new minimum applicable K0/K2 value is applied to the PDSCH/PUSCH of the scheduled cell from the slot (n+X) of the scheduling cell. That is, when DCI indicating a change of the minimum applicable K0/K2 value is received in slot n of the scheduling cell, the changed minimum applicable K0/K2 value is applied from slot n+X of the scheduling cell.

In case of self-carrier scheduling and at least PDCCH monitoring case 1-1 (to be described later), X=max(Y, Z). Here, Y is the active minimum applicable K0 value of the active DL BWP before the change indication, Z is (1, 1, 2, 2) for each downlink subcarrier spacing (DL SCS) (15, 30, 60, 120) kHz, respectively.

In the above definition, Z may be defined as "the minimum feasible non-zero application delay that may depend on DL SCS", and it might be interpreted as the minimum time for PDCCH decoding.

The Z value is applied when Y is 0 or less than Z. In this case, the new minimum applicable value K0/K2 (K0 min/K2 min) may mean that it is applied from the point in time when the UE recognizes the corresponding value (i.e., the time when PDCCH decoding ends).

Figure 14:
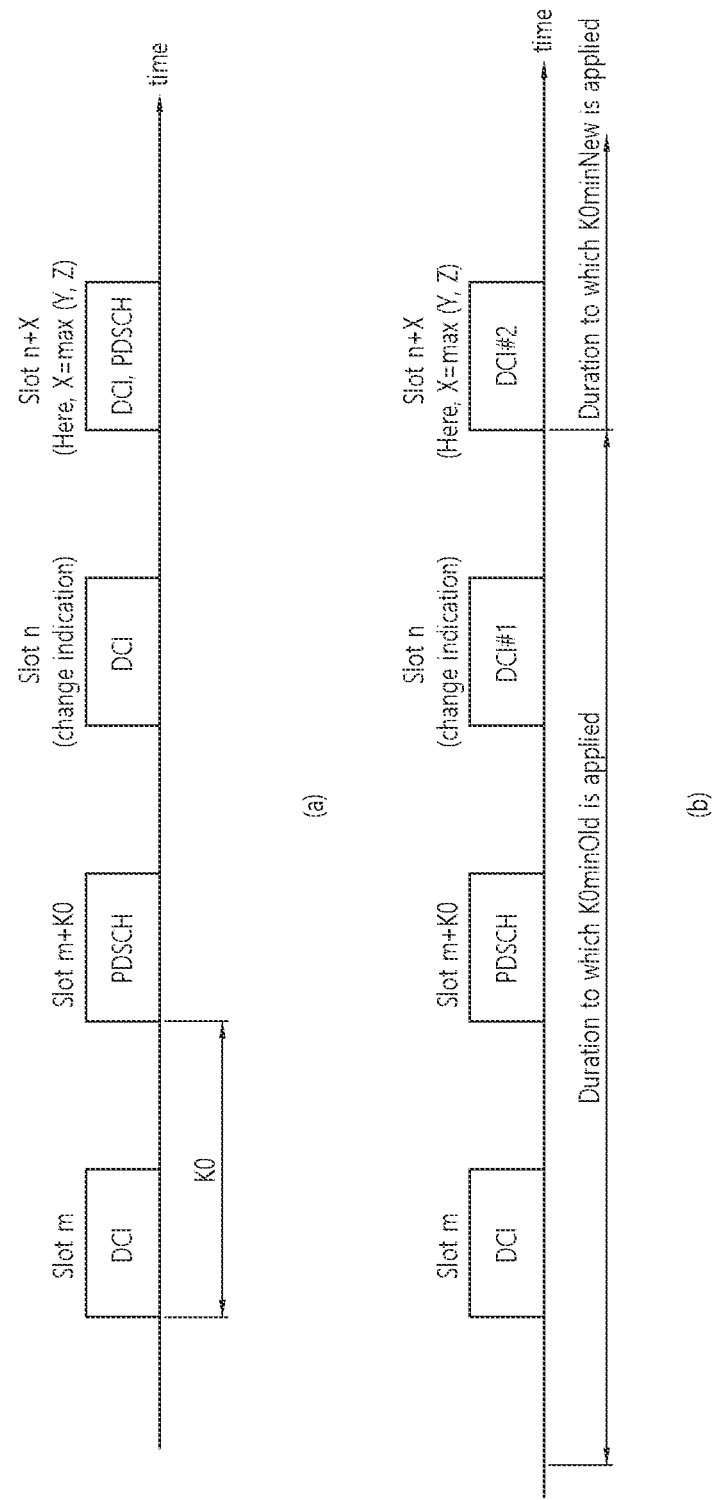
FIG. 14 is an example of applying an application delay.

FIG. 14 is an example of applying an application delay.

Referring to FIG. 14(a), the UE receives DCI in slot m, and receives the PDSCH scheduled by the DCI in slot m+K0. In this case, for example, it is assumed that the K0 min value that is the minimum applicable slot offset is 1 and the K0 value is 2. Then, the UE may receive DCI including information indicating a change of the minimum applicable slot offset in slot n. Through this, for example, suppose that the value of K0 min is changed to 0. In this case, the change of the minimum applicable slot offset is applied from slot n+X, not from slot n. The value of X may be determined to be a largest value among Y and Z, such as max(Y, Z). Here, Y is the active minimum applicable K0 value of the active DL BWP before the change indication, Z may be (1, 1, 2, 2) in turn for the case where the DL SCS is (15, 30, 60, 120) kHz. In slot n+X, the UE may receive a DCI indicating 0 as a value of K0, and may also receive a PDSCH scheduled by the DCI.

Referring to FIG. 14(b), the UE may receive DCI #1 including information indicating a change of the minimum applicable slot offset in slot n. In this case, the changed minimum applicable slot offset (let's call it K0 minNew) is applied from slot n+X, not directly applied from slot n. That is, DCI #2 received in slot n+X indicates a K0 value greater than or equal to K0 minNew. From the UE's point of view, from slot n+X, it is expected to receive a DCI indicating a K0 value greater than or equal to K0 minNew. Until slot n+X, the existing minimum applicable slot offset (let's call this K0 minOld) is applied.

PDCCH monitoring case 1-1, case 1-2, and case 2 may be defined as follows.

Case 1: a case that the PDCCH monitoring period is 14 or more symbols.

Case 1-1: a case that PDCCH monitoring is performed on up to 3 OFDM symbols from the beginning of a slot.

Case 1-2: a case that PDCCH monitoring is performed on any up to 3 consecutive OFDM symbols of a slot.

For a given UE, all search space configurations are within the same range of three consecutive OFDM symbols in a slot.

Case 2: a case that the PDCCH monitoring period is less than 14 symbols. This includes monitoring the PDCCH on up to 3 OFDM symbols from the beginning of the slot.

This disclosure proposes a method of defining 'application delay' in each case and cross-carrier scheduling.

<Application Delay>

Figure 15:
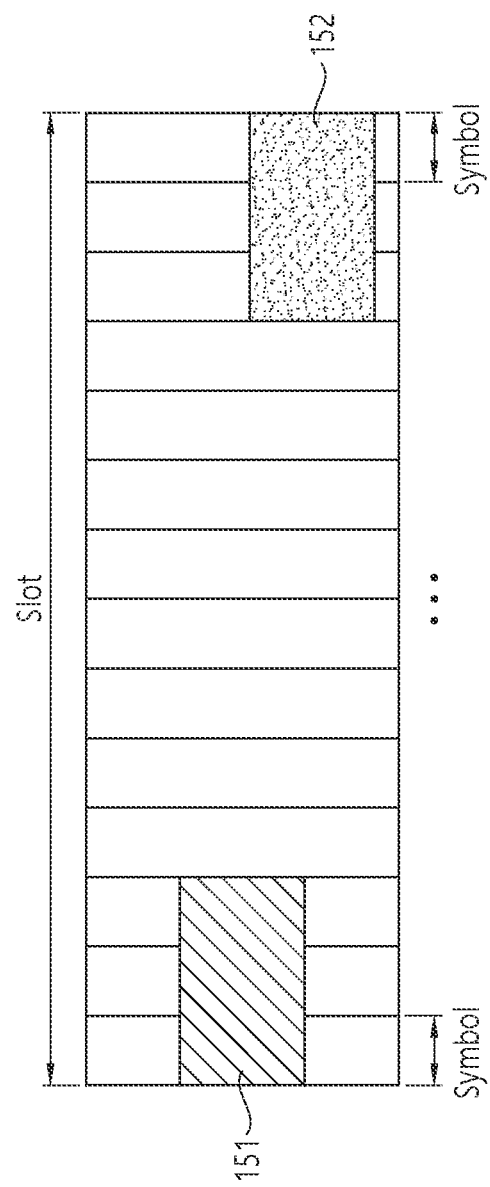
FIG. 15 illustrates a location of a CORESET for PDCCH monitoring.

FIG. 15 illustrates a location of a CORESET for PDCCH monitoring.

Referring to FIG. 15, the first CORESET 151 for PDCCH monitoring is located within the first three symbols of the slot, and the second CORESET 152 for PDCCH monitoring is located outside the first three symbols of the slot, for example, may be located in the last three symbols of the slot. It can be seen that the first CORESET 151 corresponds to the aforementioned cases 1-1 and 1-2, and the second CORESET 152 corresponds to the aforementioned cases 1-2.

That is, in case 1-2, unlike case 1-1 (the CORESET for PDCCH monitoring is located within the first 3 symbols in the slot), there is no position restriction in the slot of the CORESET for monitoring the PDCCH. As shown in FIG. 15, the network may instruct the UE to position the CORESET in the last 3 symbols in the slot and monitor the PDCCH. This means that the PDCCH decoding end time (i.e., DCI decoding end time) may be different depending on the location of the CORESET. In determining the application delay X value for indicating the change of the minimum applicable value K0/K2 (K0 min/K2 min) through DCI and determining the application timing, this point should be considered.

For example, when Y=0, Z=1, X=max(Y,Z)=1 is given. This means that the changed minimum applicable value K0/K2 (K0 min/K2 min) is applied to the slot immediately following the change indicated. However, there may be cases where this is not possible.

For example, PDCCH decoding may end in the next slot. For example, if the CORESET for PDCCH monitoring is located in the last 3 symbols of a slot, the UE will receive the PDCCH in the last 3 symbols and then decode the PDCCH in the next slot. Therefore, it may not be possible to apply the PDCCH decoding result from the beginning of the next slot.

In order to solve such a problem, the present disclosure proposes the following method. A solution method using the Z value is proposed below, but the same method may be applied to the X or Y value.

Option 1) It can be applied by adding a specific value (e.g., 1) to the predefined Z value.

Option 1 is the simplest solution, and in cases 1-2, the application delay can be derived by adding a specific value (e.g., 1) to the Z value. In this case, the specific value may be predefined or indicated through higher layer signaling (e.g., RRC, MAC CE, etc.) of the network.

Option 2) Determining the Z value based on the location of the CORESET (group).

The UE may determine whether to add a specific value (e.g., 1) to the Z value according to the location of the CORESET to be monitored in the corresponding slot. To this end, the location of the CORESET serving as a reference may be defined in advance or may be indicated by higher layer signaling of the network. Alternatively, the reference position of the CORESET may be determined according to the decoding capability of the UE. In this case, the UE may report the decoding capability (e.g., the position of the CORESET capable of terminating PDCCH decoding within the corresponding slot).

As the CORESET, all CORESETs monitored in the corresponding slot may be considered, or the CORESET, where non-fallback DCI to which the minimum applicable K0/K2 may be indicated is monitored, may be limitedly applied to.

For example, when all or part of the CORESET (in which PDCCH monitoring needs to be performed) exists after a specific symbol index (indicated in advance, or indicated by higher layer signaling of the network, or indicated by the capability reported by the UE), the UE may derive an application delay by adding a specific value (e.g., 1) to a predefined Z value.

Option 3) Z values specific to the case 1-2.

The network may separately indicate the Z value to be applied to Case 1-2. Alternatively, the Z value for Case 1-2 may be determined by a predefined definition. In addition, as in option 2, it may determine whether to apply the Z value for the case 1-2 depending on the location of the CORESET, in option 3.

Case 2.

Case 2 refers to a case in which a plurality of monitoring occasions of a specific search space set are set (or can be set) in one slot. In case 2, the following method can be considered.

Option 1) A method that does not apply the power saving technique using cross-slot scheduling to case 2.

As described above, the power saving technique using cross-slot scheduling is a scheme of performing a power saving operation during a slot offset between the PDCCH and the scheduled PDSCH. However, in case 2, since one search space set may have a plurality of monitoring occasions within one slot, it may be difficult to expect power savings due to sleep or the like. Therefore, in case 2, it can be assumed that the power saving operation by the minimum applicable K0 is not performed.

In addition, the PDCCH monitoring occasion is determined by the search space set setting. When a plurality of search space sets are configured, different cases may be applied to each slot. Therefore, when different cases are applied to each slot, option 1 may be interpreted as suggesting that it is assumed that cross-slot scheduling is not applied in the slot corresponding to case 2 or that the minimum applicable value K0/K2 is not changed in the slot corresponding to case 2.

As another method, when the minimum applicable value K0/K2 is newly indicated (i.e., changed) by DCI transmitted in the slot corresponding to case 2, the UE may ignore the indication. This method can be applied to case 1-2 as well as case 2.

Option 2) A method of applying an application delay for each monitoring occasion Since the application delay means the time when the newly indicated minimum applicable values K0/K2 are applied, a method of defining the application delay for each monitoring occasion may also be considered. Therefore, in case 2, application delay can be applied for each monitoring occasion, this may mean that the application delay derivation method applied to Case 1-1 and Case 1-2 is applied according to the location of the monitoring occasion in the slot.

<Cross Carrier Scheduling>

Cross-carrier scheduling refers to a method of scheduling a PDSCH of a scheduled cell (a cell which is scheduled) in a PDCCH of a scheduling cell (a cell performing scheduling). That is, the PDCCH for PDSCH scheduling is decoded in the scheduling cell (more specifically, the active DL BWP of the scheduling cell), and scheduling of the PDSCH transmitted in the scheduled cell (more specifically, the active DL BWP of the scheduled cell) is performed through the corresponding DCI.

When applying a power saving technique using cross-slot scheduling in a scheduled cell (active BWP), the application delay for the minimum applicable value K0/K2 of the scheduled cell (active BWP) may be defined in the following method.

Option 1) Scheduling Cell (Active BWP) Based Application Delay

The application delay can be interpreted as an offset from the slot in which the DCI indicating the new minimum applicable K0/K2 is transmitted to the slot to which the corresponding value is actually applied. This is closely related to PDCCH decoding. As described above, since the cross-carrier scheduling is a process of scheduling the PDSCH of a scheduled cell through the PDCCH in the scheduling cell, it may be desirable to replace the application delay of the minimum applicable value K0/K2 of the scheduled cell with the application delay of the scheduling cell (active BWP). Therefore, the present disclosure proposes to determine Y and/or Z, which are parameters for determining the application delay, based on the scheduling cell.

For example, in cross-carrier scheduling, the application delay of the scheduled cell may be determined as follows. (Alternatively, it may be defined to follow the application delay of the scheduling cell.)

For the application delay X to apply the minimum applicable K0/K2 value(s) indicated for the scheduled cell, triggered by a 1-bit indication of DCI format 1_1 or 0_1 in the scheduling cell, the UE receives DCI indicating a change in slot n of the scheduling cell, the UE may be scheduled with the minimum applicable K0/K2 value for the PDSCH/PUSCH of the scheduled cell in DCI in the slot (n+X) of the scheduling cell.

For cross-carrier scheduling, X=max(Y, Z). Here, Y is the active minimum applicable K0 value of the active DL BWP of the scheduling cell, and Z is (1, 1, 2, 2) for each downlink subcarrier spacing (DL SCS) (15, 30, 60, 120) kHz of the active BWP of the scheduling cell, respectively.

Option 2) Application Delay Based on Scheduled Cell (Active BWP)

When the UE separately performs processing (e.g., PDCCH decoding) for the scheduling cell and the scheduled cell, the PDCCH scheduling the PDSCH of the scheduled cell is transmitted in the scheduling cell, but the application delay for the change of the minimum applicable value of the scheduled cell may be determined based on the scheduled cell. However, in this case, if the scheduling cell and the scheduled cell have different numerology, a process of scaling to fit the numerology of the scheduling cell may be required. For example, in cross-carrier scheduling, the application delay of the scheduled cell may be determined as follows.

In the application delay X for applying the minimum applicable K0/K2 value(s) indicated for the scheduled cell triggered by the 1-bit indication of DCI format 1_1 or 0_1 in the scheduling cell, the UE receives DCI indicating a change in slot n of the scheduling cell, the UE may be scheduled with the minimum applicable K0/K2 value for the PDSCH/PUSCH of the scheduled cell in DCI in the slot (n+X) of the scheduling cell.

For cross-carrier scheduling, X=max(Y, Z)·($2^{\mu_{scheduling}}/2^{\mu_{scheduled}}$) or X=ceil(max(Y, Z)·($2^{\mu_{scheduling}}/2^{\mu_{scheduled}}$)). Here, Y is the active minimum applicable K0 value of the active DL BWP of the scheduled cell before the change indication. For each downlink subcarrier spacing (DL SCS) (15, 30, 60, 120) kHz of the active BWP of the scheduled cell, z is (1, 1, 2, 2) respectively.

In the above formula, $\mu_{scheduling}$ denotes the scheduling cell's numerology (subcarrier spacing configuration), and $\mu_{scheduled}$ denotes the scheduled cell's numerology (subcarrier spacing configuration). For {15 kHz, 30 kHz, 60 kHz, 120 kHz}, it may have values of {0, 1, 2, 3} respectively.

Option 3) Combination of Option 1 and 2

Parameters Y and Z may be determined based on a scheduled cell and a scheduling cell, respectively. For example, since Y means the minimum applicable value K0/K2 before change, it is determined based on the scheduled cell to which the minimum applicable value is applied. And Z may be determined based on a scheduling cell in which actual PDCCH decoding is performed.

In cross-carrier scheduling, the application delay of the scheduled cell may be determined as follows.

In the application delay X for applying the minimum applicable K0/K2 value(s) (K0 min/K2 min) indicated for the scheduled cell triggered by the 1-bit indication of DCI format 1_1 or 0_1 in the scheduling cell, the UE receives DCI indicating a change in slot n of the scheduling cell, the UE may be scheduled with the minimum applicable K0/K2 value for the PDSCH/PUSCH of the scheduled cell in DCI in the slot (n+X) of the scheduling cell.

For cross-carrier scheduling, X=max(Y·($2^{\mu scheduling}/2^{\mu scheduled}$),Z) or X=max(ceil(Y·($2^{\mu scheduling}/2^{\mu scheduled}$)), Z). Here, Y is the active minimum applicable K0 value of the active DL BWP of the scheduled cell before the change indication, Z is (1, 1, 2, 2) for each downlink subcarrier spacing (DL SCS) (15, 30, 60, 120) kHz of the active BWP of the scheduling cell, respectively.

Figure 16:
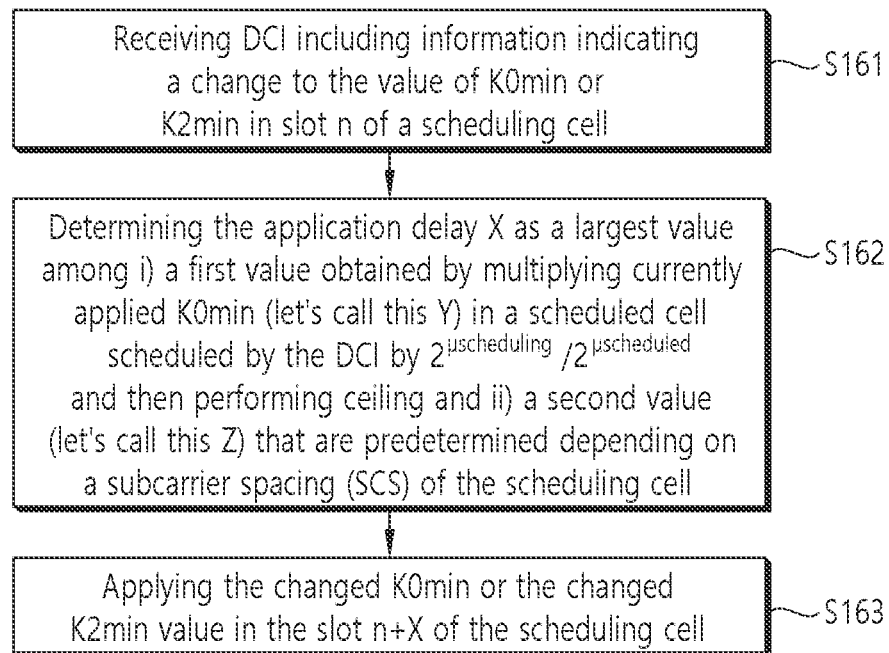
FIG. 16 illustrates a method for determining an application delay value according to option 3.

FIG. 16 illustrates a method for determining an application delay value according to option 3.

Referring to FIG. 16, the UE receives downlink control information (DCI) including information indicating a change to the value of K0 min or K2 min in slot n of a scheduling cell (S161). The DCI may be received in symbols before a specific symbol index of the slot n (e.g., the first 3 symbols of the slot n).

Each of the K0 min and K2 min is an applied minimum scheduling offset restriction. Specifically, the K0 min may be a minimum scheduling offset restriction related to a minimum value of an offset between a slot for receiving the first DCI and a slot for receiving a physical downlink shared channel (PDSCH) scheduled by the first DCI, the K2 min may be a minimum scheduling offset restriction related to a minimum value of an offset between a slot for receiving the second DCI and a slot for transmitting a physical uplink shared channel (PUSCH) scheduled by the second DCI.

The UE may determine the application delay X as a largest value among i) a first value obtained by multiplying currently applied K0 min (let's call this Y) in a scheduled cell scheduled by the DCI by $2^{\mu scheduling}/2^{\mu scheduled}$ and then performing ceiling and ii) a second value (let's call this Z) that are predetermined depending on a subcarrier spacing (SCS) of the scheduling cell (S162).

That is, the application delay X can be determined by the following equation.

$$X = \max\left(\left\lceil Y \cdot \frac{2^{\mu_{scheduling}}}{2^{\mu_{scheduled}}} \right\rceil, Z\right) \quad \text{[Equation 1]}$$

The $\mu_{scheduling}$ is a subcarrier spacing configuration of the scheduling cell (That is, subcarrier spacing configuration associated with PDCCH, therefore, $\mu_{scheduling}$ may be expressed as $\mu_{PDCCH}$) and the $\mu_{scheduled}$ is a subcarrier spacing configuration of the scheduled cell (That is, subcarrier spacing configuration associated with PDSCH, therefore, $\mu_{scheduled}$ may be expressed as $\mu_{PDSCH}$). The Y is the K0 min value currently applied to the scheduled cell, and the Z is the second value.

Z may be predetermined as shown in the following table depending on the subcarrier spacing (SCS) (or subcarrier spacing configuration μ) of the scheduling cell.

TABLE 6

| μ | Z |
|---|---|
| 0 | 1 |
| 1 | 1 |
| 2 | 2 |
| 3 | 2 |

That is, when the subcarrier spacing (SCS) of the scheduling cell is 15, 30, 60, and 120 kHz, the Z value may be predetermined as 1, 1, 2, 2, respectively.

The UE applies the changed K0 min or the changed K2 min value in the slot n+X of the scheduling cell (S163).

On the other hand, as described above in 'Option 2) Determining the Z value based on the location of the CORESET (group), if the DCI is received in symbols after the specific symbol index of slot n (e.g., symbols outside the first 3 symbols of slot n), after increasing the second value Z by 1, the value of X is determined. The reason for doing this is considering that the decoding (complete) timing of the DCI may be slot n+1 instead of slot n depending on the location of the CORESET.

For example, let assume that downlink control information (DCI) including information indicating a change in the value of K0 min or K2 min is received in the last three symbols of slot n. In this case, Equation 1 is used in obtaining the application delay X, but the Z value from Table 6 is incremented by one (i.e., Z+1), instead of the Z value from Table 6, and then used for Z of Equation 1.

Figure 17:
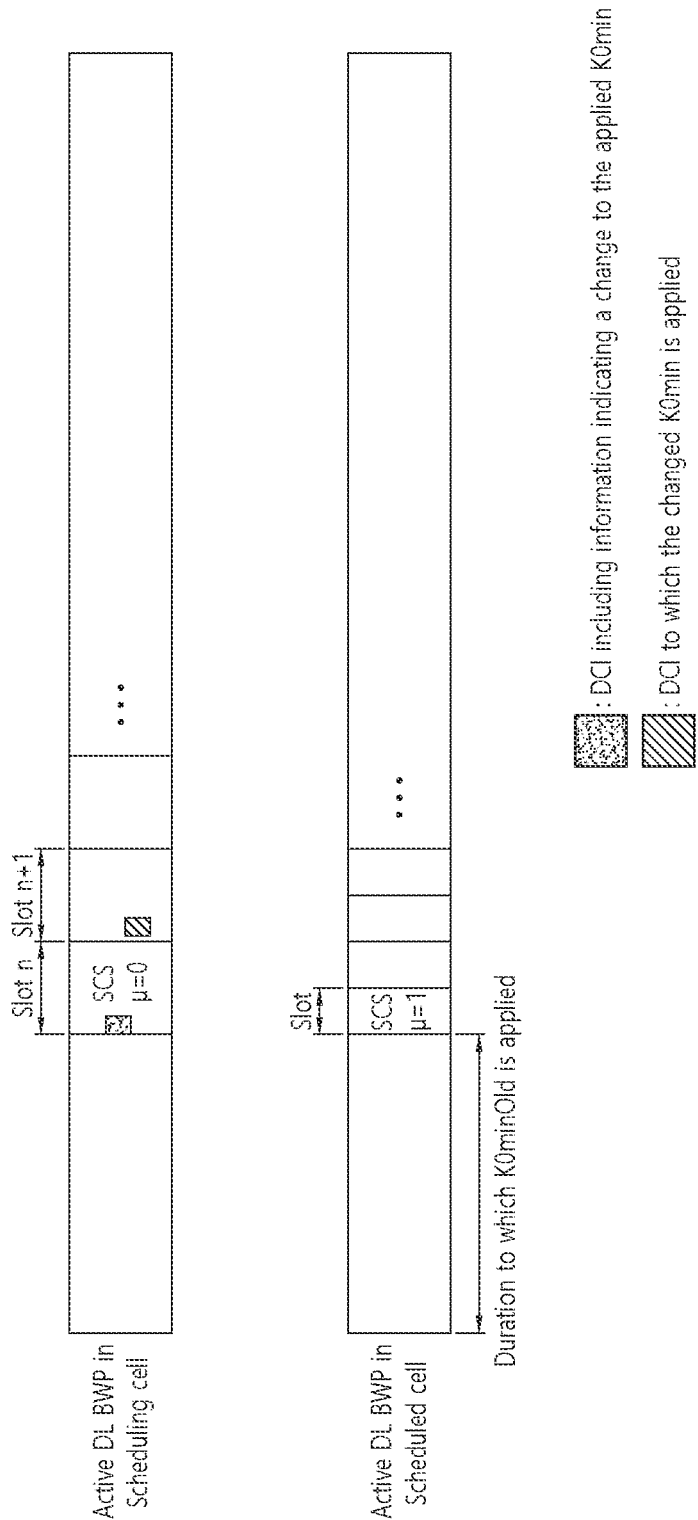
FIG. 17 is an example of applying the method of FIG. 16.

FIG. 17 is an example of applying the method of FIG. 16.

Referring to FIG. 17, it is assumed that the subcarrier spacing (SCS) configuration of the scheduling cell is μ=0, and the SCS configuration μ=1 of the scheduled cell. It is assumed that K0 min (i.e., Y) currently applied to the scheduled cell is referred to as K0 minOld for convenience, and its value is 1. Since the subcarrier spacing (SCS) configuration of the scheduling cell μ=0, Z=1.

DCI including information indicating a change to K0 min may be received within the first three symbols of the slot n of the active DL BWP of the scheduling cell. Also, assume that the DCI is a DCI for cross-carrier scheduling.

The DCI may be, for example, DCI format 0_1 for scheduling one or more PUSCHs and DCI format 1_1 for scheduling PDSCH. Each of DCI format 0_1 and DCI format 1_1 may or may not include a 1-bit 'Minimum applicable scheduling offset indicator', FIG. 17 exemplifies an inclusion case. In case of DCI format 0_1, when the value of 'Minimum applicable scheduling offset indicator' is 0, it indicates the first value among the K2 min values set by the higher layer signal. When the value of 'Minimum applicable scheduling offset indicator' is 1, it indicates the second value (if any) or 0 (if there is no second value) among the K2 min values set by the higher layer signal. In case of DCI format 1_1, when the value of 'Minimum applicable scheduling offset indicator' is 0, it indicates the first value among the K0 min values set by the higher layer signal. When the value of 'Minimum applicable scheduling offset indicator' is 1, it indicates the second value (if any) or 0 (if there is no second value) among the K0 min values set by the higher layer signal.

It is possible to determine whether a change in the K0 min/K2 min value is indicated according to the value of K0 min/K2 min indicated by the value of 'Minimum applicable scheduling offset indicator'.

When the DCI indicates a change in the value of K0 min (/K2 min), the time point at which the changed K0 min(/K2 min) is applied is slot n+X, where X is X=max(ceil(1·2⁰/2¹),1)=1 according to Equation 1 above. Accordingly, the time point at which the changed K0 min/K2 min is applied becomes slot n+1.

Figure 18:
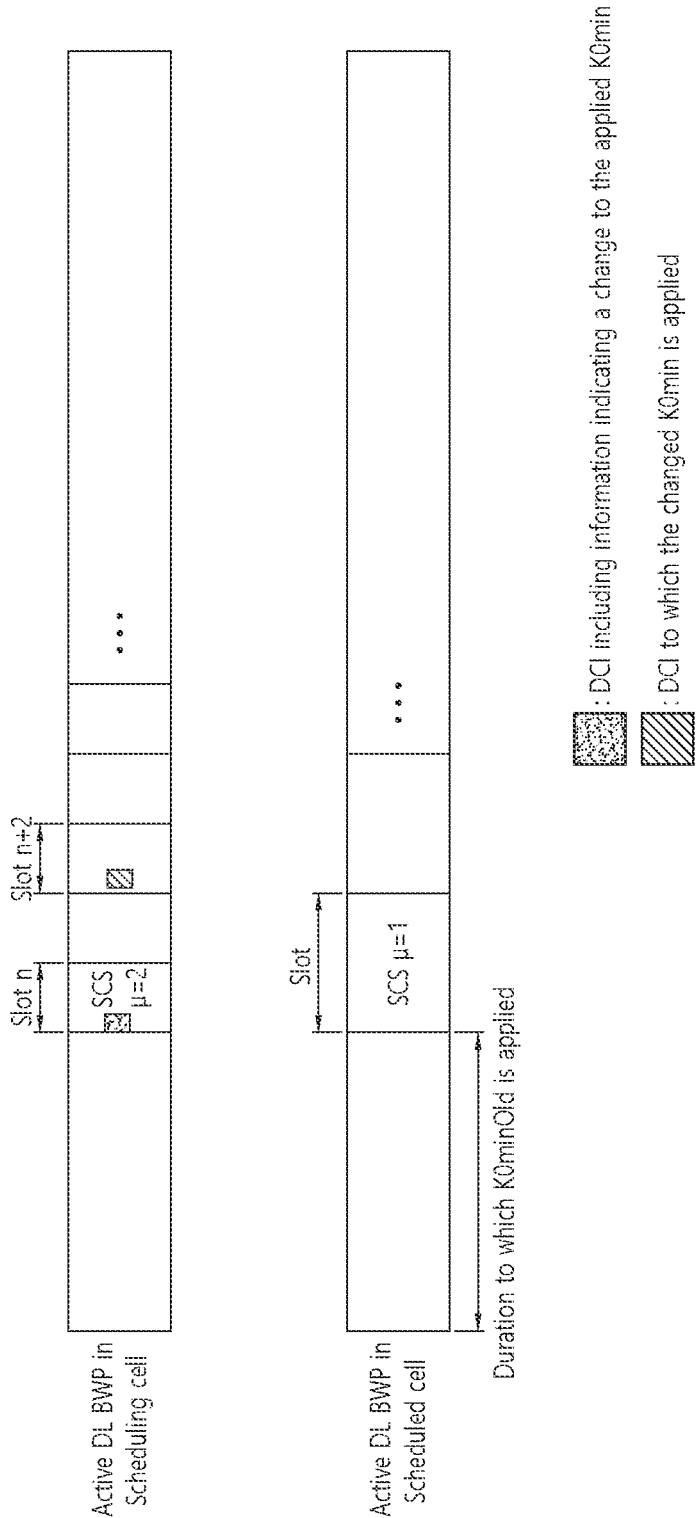
FIG. 18 is another example of applying the method of FIG. 16.

FIG. 18 is another example of applying the method of FIG. 16.

Referring to FIG. 18, it is assumed that the subcarrier spacing (SCS) configuration of the scheduling cell is μ=2, and the SCS configuration of the scheduled cell is μ=1. It is assumed that K0 min (i.e., Y) currently applied to the scheduled cell is referred to as K0 minOld for convenience, and its value is 1. Since the subcarrier spacing (SCS) configuration of the scheduling cell is ρ=2, Z=2.

DCI including information indicating a change of K0 min may be received within the first three symbols of the slot n of the active DL BWP of the scheduling cell. Also, assume that the DCI is a DCI for cross-carrier scheduling.

When the DCI indicates a change in the value of K0 min(/K2 min), the time point at which the changed K0 min(/K2 min) is applied is slot n+X, where X is, according to Equation 1, X=max(ceil(1,2²/2¹),2)=2. Accordingly, the time point at which the changed K0 min/K2 min is applied becomes slot n+2.

Figure 19:
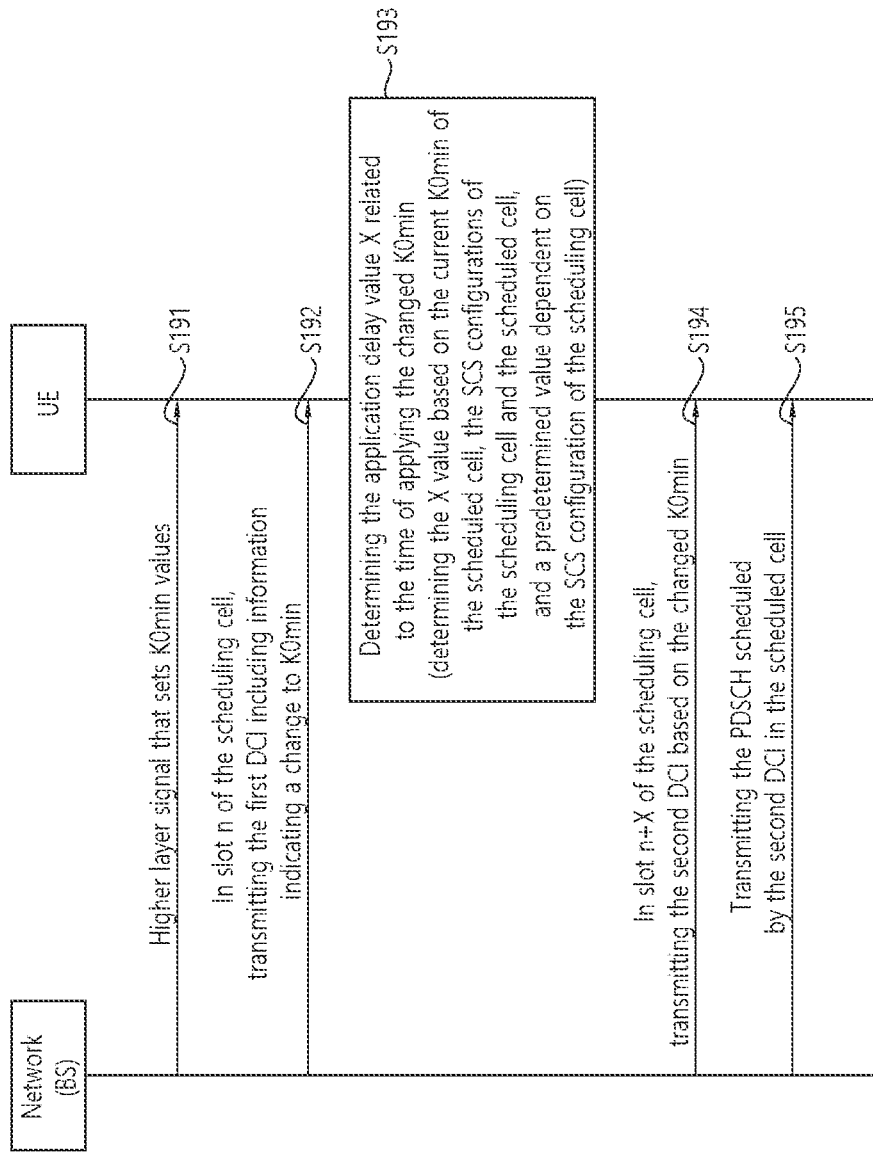
FIG. 19 illustrates a signaling method between a network (base station UE.

FIG. 19 illustrates a signaling method between a network (base station) and a UE.

Referring to FIG. 19, the base station provides a higher layer signal for setting K0 min values to the UE (S191). For example, 'minimumSchedulingOffsetK0' may be provided through 'PDSCH-Config' used to set UE-specific PDSCH parameters, and 'minimumSchedulingOffsetK0' may include a list of K0 min values.

The base station transmits the first DCI including information indicating a change to K0 min to the UE in slot n of the scheduling cell (S192). The first DCI may be DCI format 1_1. The first DCI may be transmitted within the first three symbols of slot n or outside the first three symbols, and the Z value used to determine the application delay X may vary depending on where the first DCI is transmitted. This has already been described above. The first DCI may inform the change of K0 min through a 1-bit field. This has already been described above.

The UE determines an application delay value X related to the time of applying the changed K0 min (S193). As described above, the X value may be determined based on the current K0 min of the scheduled cell, the SCS configurations of the scheduling cell and the scheduled cell, and a predetermined value dependent on the SCS configuration of the scheduling cell. For example, Equation 1 can be used.

The base station transmits the second DCI to which the changed K0 min is applied (a second DCI based on the changed K0 min) in slot n+X of the scheduling cell (S194). Thereafter, the PDSCH scheduled by the second DCI is transmitted in the scheduled cell (S195). The time interval between the second DCI and the PDSCH must be equal to or greater than the changed K0 min. In the time interval, the UE may perform a sleep operation or a PDCCH decoding relaxation operation to save power.

Figure 20:
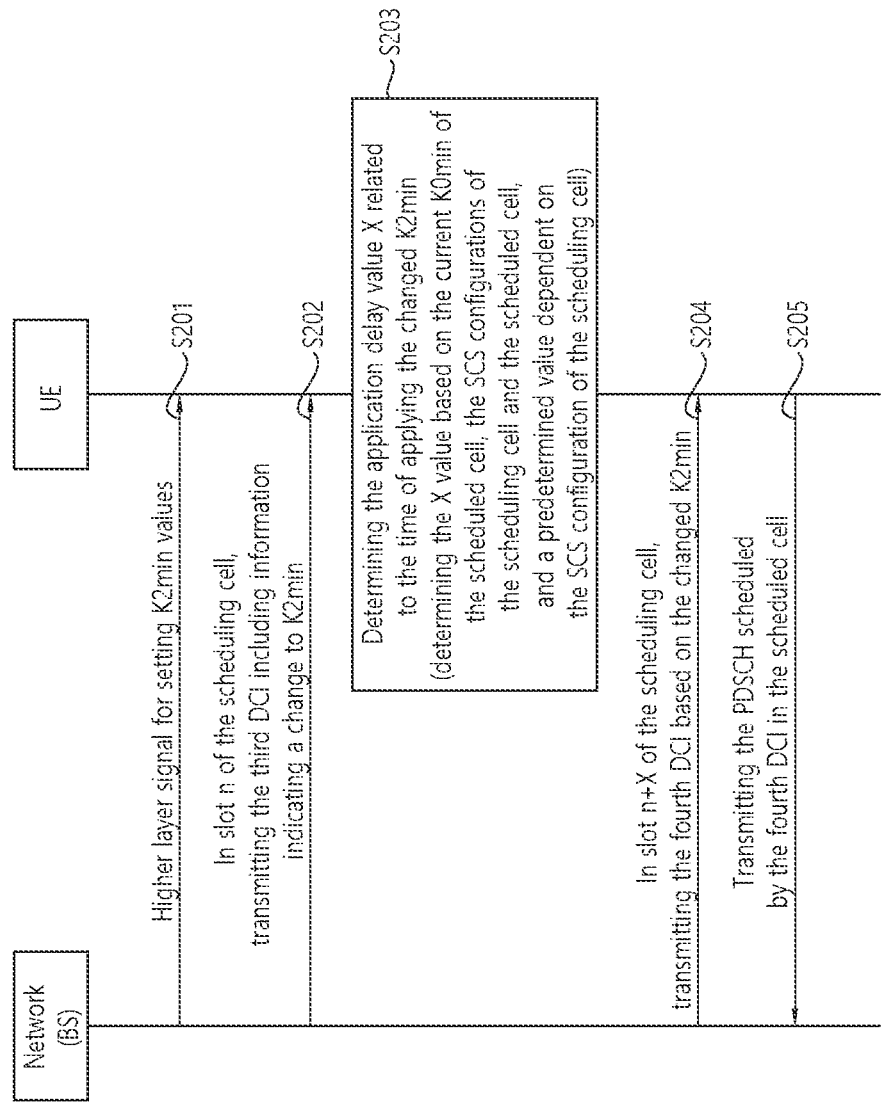
FIG. 20 illustrates a signaling method between a network (base station) and a UE.

FIG. 20 illustrates a signaling method between a network (base station) and a UE.

Referring to FIG. 20, the base station provides a higher layer signal for setting K2 min values to the UE (S201). For example, 'minimumSchedulingOffsetK2' may be provided through 'PUSCH-Config' used to set UE-specific PUSCH parameters, and 'minimumSchedulingOffsetK2' may include a list of K2 min values.

The base station transmits a third DCI including information indicating a change to K2 min to the UE in slot n of the scheduling cell (S202). The third DCI may be DCI format 0_1. The third DCI may be transmitted within the first three symbols of slot n or outside the first three symbols, and the Z value used to determine the application delay X may vary depending on where it is transmitted. This has already been described above. The third DCI may inform the change of K2 min through a 1-bit field. This has already been described above.

The UE determines the application delay value X related to the time to apply the changed K2 min (S203). As described above, the X value may be determined based on the current K0 min of the scheduled cell, the SCS configurations of the scheduling cell and the scheduled cell, and a predetermined value dependent on the SCS configuration of the scheduling cell. For example, Equation 1 can be used.

The base station transmits a fourth DCI to which the changed K2 min is applied (a fourth DCI based on the changed K2 min) in slot n+X of the scheduling cell (S204). Thereafter, the PUSCH scheduled by the fourth DCI is received in the scheduled cell (S205). The time interval between the fourth DCI and the PUSCH must be equal to or greater than the changed K2 min. In the time interval, the UE may perform a sleep operation or a PDCCH decoding relaxation operation to save power.

Figure 21:
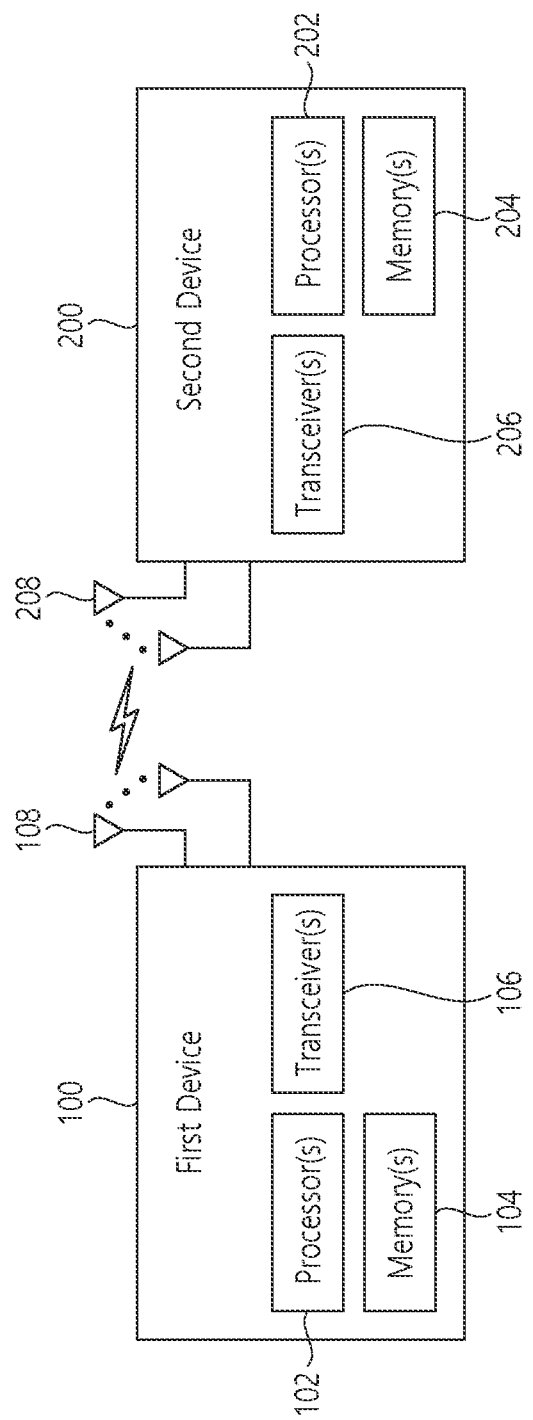
FIG. 21 illustrates a wireless device that is applicable to the disclosure.

FIG. 21 illustrates a wireless device applicable to this specification.

Referring to FIG. 21, the first wireless device 100 and the second wireless device 200 may transmit/receive wireless signals through various wireless access technologies (e.g., LTE, NR).

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In this specification, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In this specification, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The one or more processors 102 and 202 may be implemented as at least one computer readable medium (CRM) including instructions based on being executed by the at least one processor.

For example, each method described in FIGS. 16 to 20 may be performed by at least one computer readable medium (CRM) including instructions based on being executed by at least one processor. The CRM may perform, for example, receiving downlink control information (DCI) including information for a change to a value of K0 min or K2 min in a slot n of a scheduling cell, each of the K0 min and K2 min being an applied minimum scheduling offset restriction, and applying a changed K0 min or a changed K2 min value in a slot n+X of the scheduling cell. The X value is a largest value among i) a first value obtained by multiplying currently applied K0 min (Y) in a scheduled cell scheduled by the DCI by $2^{\mu scheduling}/2^{\mu scheduled}$ and then performing ceiling and ii) a second value (Z) that are predetermined depending on a subcarrier spacing (SCS) of the scheduling cell. The µscheduling is a subcarrier spacing configuration of the scheduling cell and the µscheduled is a subcarrier spacing configuration of the scheduled cell.

The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 22:
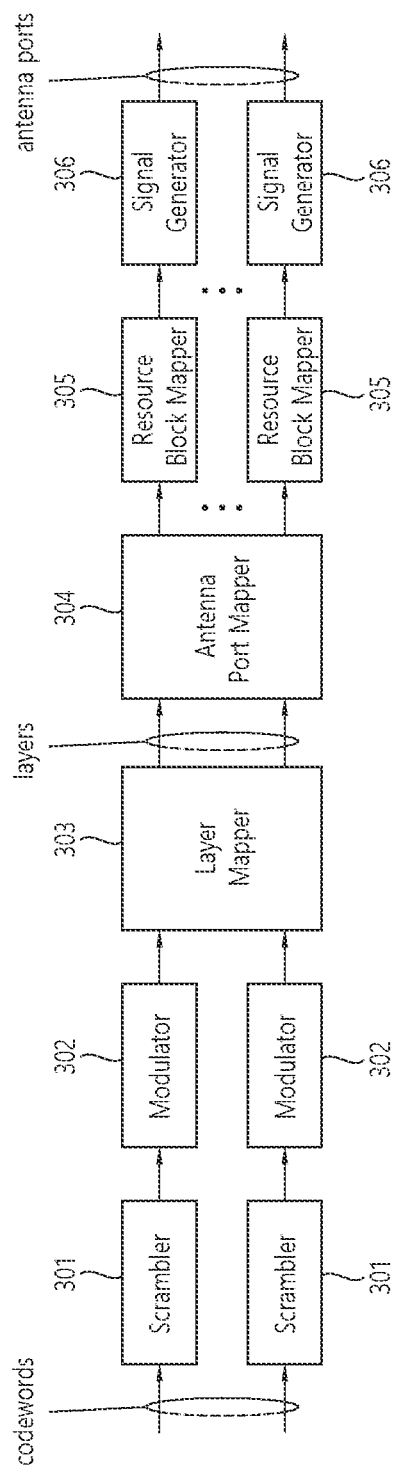
FIG. 22 illustrates a signal processing circuit for a transmission signal.

FIG. 22 shows an example of a structure of a signal processing module. Herein, signal processing may be performed in the processors 102 and 202 of FIG. 21.

Referring to FIG. 22, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 23:
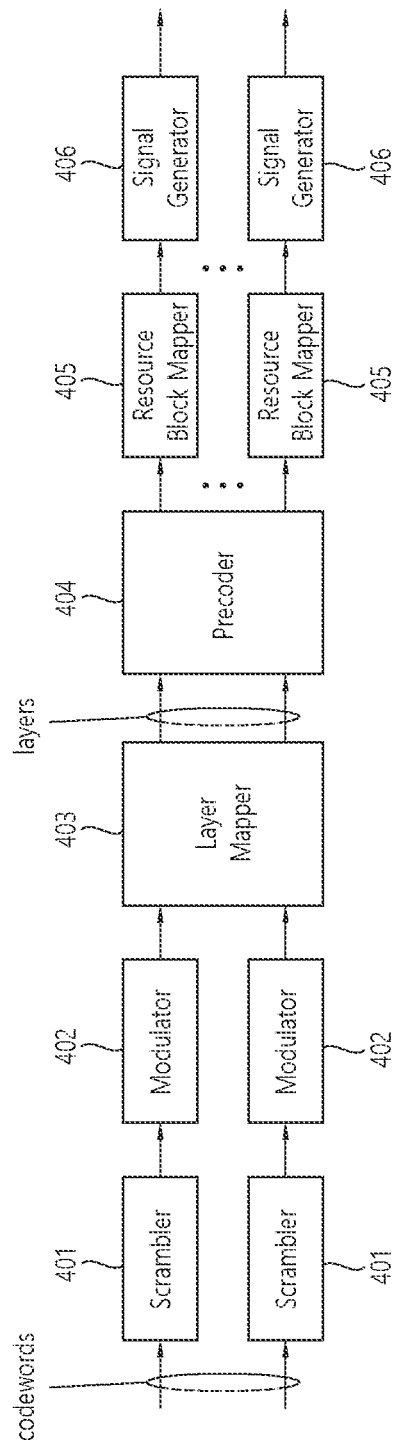
FIG. 23 shows another example of the structure of a signal processing module in a transmission device.

FIG. 23 shows another example of a structure of a signal processing module in a transmitting device. Herein, signal processing may be performed in a processor of a UE/BS, such as the processors 102 and 202 of FIG. 21.

Referring to FIG. 23, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 24:
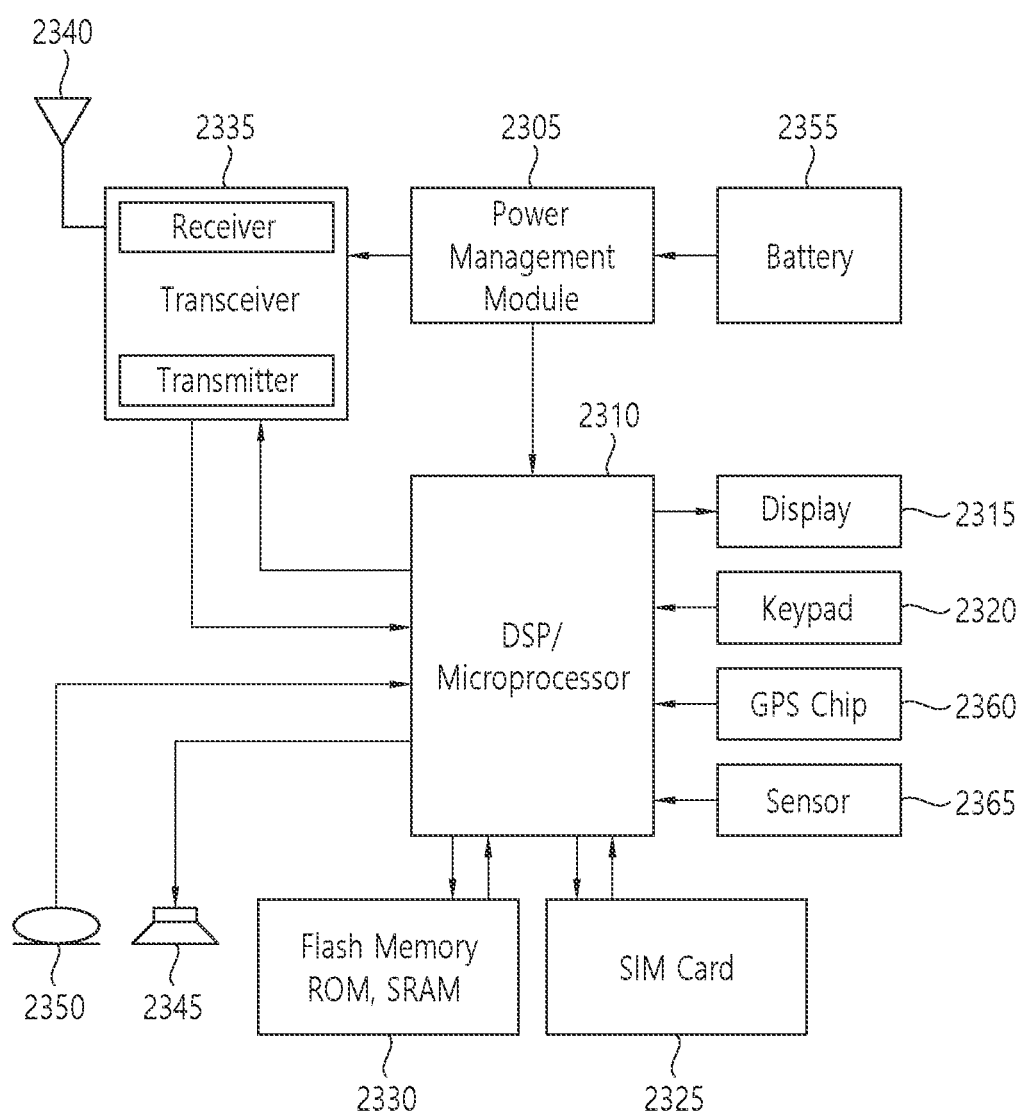
FIG. 24 illustrates an example of a wireless communication device according to an implementation of the present disclosure.

FIG. 24 illustrates an example of a wireless communication device according to an implementation example of the present disclosure.

Referring to FIG. 24, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 24 may be the processors 102 and 202 in FIG. 21.

The memory 2330 is connected to the processor 2310 and stores information related to operations of the processor. The memory may be located inside or outside the processor and connected to the processor through various techniques such as wired connection and wireless connection. The memory 2330 in FIG. 24 may be the memories 104 and 204 in FIG. 21.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 24 may be the transceivers 106 and 206 in FIG. 21.

Although not shown in FIG. 24, various components such as a camera and a universal serial bus (USB) port may be additionally included in the UE. For example, the camera may be connected to the processor 2310.

FIG. 24 is an example of implementation with respect to the UE and implementation examples of the present disclosure are not limited thereto. The UE need not essentially include all the components shown in FIG. 24. That is, some of the components, for example, the keypad 2320, the GPS chip 2360, the sensor 2365 and the SIM card 2325 may not be essential components. In this case, they may not be included in the UE.

Figure 25:
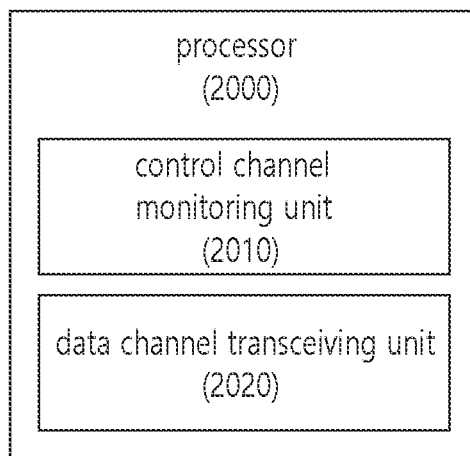
FIG. 25 shows an example of a processor 2000.

FIG. 25 shows an example of a processor 2000.

Referring to FIG. 25, the processor 2000 may include a control channel monitoring unit 2010 and a data channel receiving unit 2020. The processor 2000 may execute the methods (the position of the receiver, for example, the position of the UE) described with reference to FIGS. 16 to 20. For example, the processor 2000 receives downlink control information (DCI) including information notifying a change in the value of K0 min or K2 min in slot n of a scheduling cell, each of K0 min and K2 min being an applied minimum scheduling offset restriction. Also, the processor 2000 applies the changed K0 min or the changed K2 min value in the slot n+X of the scheduling cell. The X value is a largest value among i) a first value obtained by multiplying currently applied K0 min (Y) in a scheduled cell scheduled by the DCI by $2^{\mu scheduling}/2^{\mu scheduled}$ and then performing ceiling and ii) a second value (Z) that are predetermined depending on a subcarrier spacing (SCS) of the scheduling cell. The µscheduling is a subcarrier spacing configuration of the scheduling cell and the µscheduled is a subcarrier spacing configuration of the scheduled cell. The processor 2000 may be an example of the processors 102 and 202 of FIG. 21.

Figure 26:
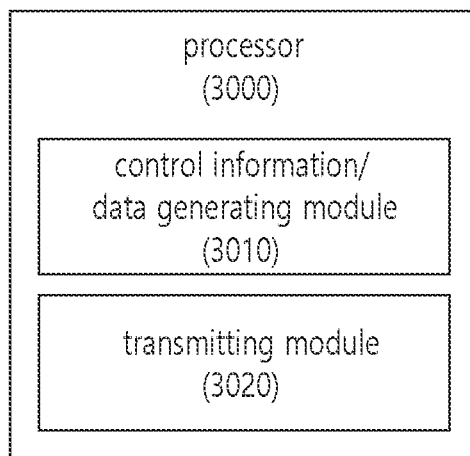
FIG. 26 shows an example of a processor 3000.

FIG. 26 shows an example of a processor 3000.

Referring to FIG. 26, the processor 3000 may include a control information/data generation module 3010 and a transmission module 3020. The processor 3000 may execute the methods described from the perspective of the transmitter in FIGS. 16 to 20. For example, the processor 3000 transmits, to a user equipment, downlink control information (DCI) including information for a change to a value of K0 min or K2 min in a slot n of a scheduling cell, each of the K0 min and K2 min being an applied minimum scheduling offset restriction. The processor 3000 may assume that the changed K0 min or the changed K2 min value is applied in the slot n+X of the scheduling cell. The X value is a largest value among i) a first value obtained by multiplying currently applied K0 min (Y) in a scheduled cell scheduled by the DCI by $2^{\mu scheduling}/2^{\mu scheduled}$ and then performing ceiling and ii) a second value (Z) that are predetermined depending on a subcarrier spacing (SCS) of the scheduling cell. The µscheduling is a subcarrier spacing configuration of the scheduling cell and the µscheduled is a subcarrier spacing configuration of the scheduled cell. The processor 3000 may be an example of the processors 102 and 202 of FIG. 21.

Figure 27:
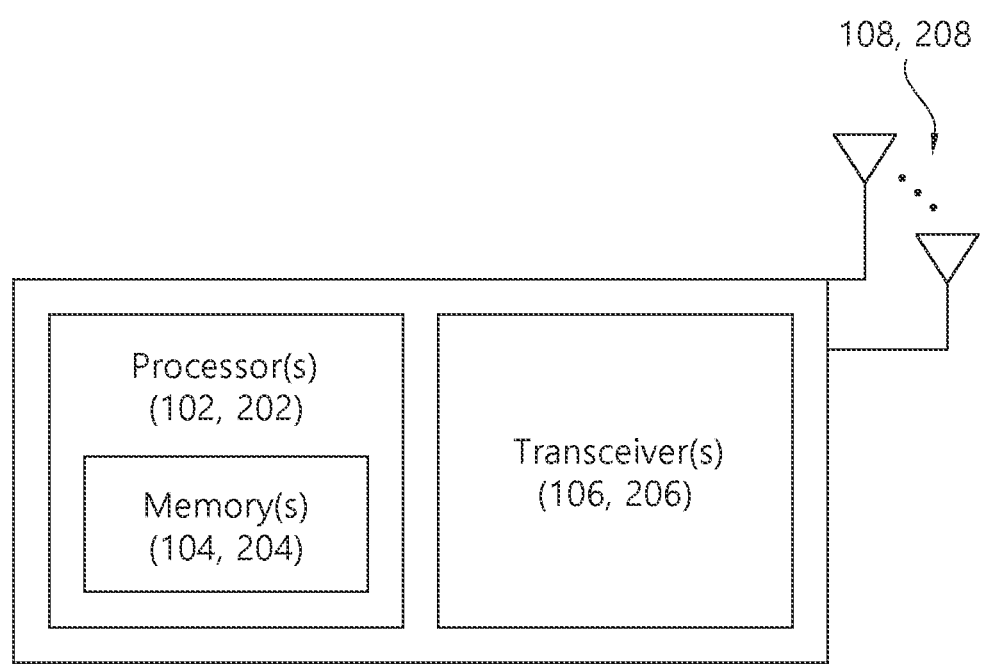
FIG. 27 shows another example of a wireless device.

FIG. 27 shows another example of a wireless device.

According to FIG. 27, a wireless device may include at least one processor 102, 202, at least one memory 104, 204, at least one transceiver 106, 206, and one or more antennas 108, 208.

The example of the wireless device described in FIG. 27 is different from the example of the wireless described in FIG. 21 in that the processors 102 and 202 and the memories 104 and 204 are separated in FIG. 21 whereas the memories 104 and 204 are included in the processors 102 and 202 in the example of FIG. 27. That is, the processor and the memory may constitute one chipset.

Figure 28:
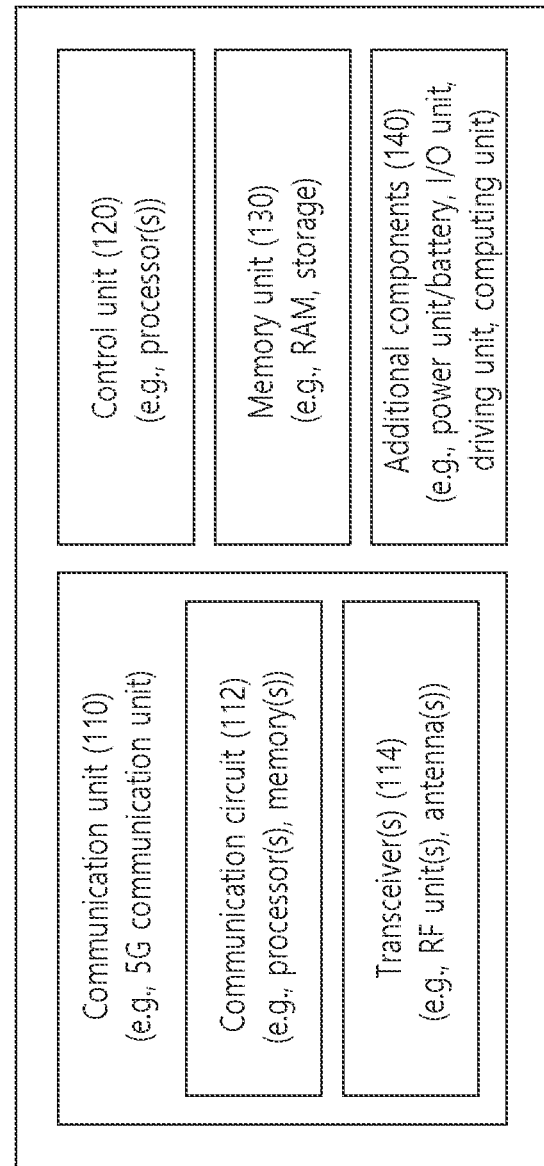
FIG. 28 shows another example of a wireless device applied to the present specification.

FIG. 28 shows another example of a wireless device applied to the present specification. The wireless device may be implemented in various forms according to a use-case/service.

Referring to FIG. 28, wireless devices 100 and 200 may correspond to the wireless devices of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 30), the vehicles (100*b*-1 and 100*b*-2 of FIG. 30), the XR device (100*c* of FIG. 30), the hand-held device (100*d* of FIG. 30), the home appliance (100*e* of FIG. 30), the IoT device (100*f* of FIG. 30), a digital broadcast UE, a hologram device, a public safety device, an MTC device, a medicine device, a fintech device (or a finance device), a security device, a climate/environment device, the AI server/device (400 of FIG. 30), the BSs (200 of FIG. 30), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. In addition, each element, component, unit/portion, and/or module within the wireless devices 100 and 200 may further include one or more elements. For example, the control unit 120 may be configured by a set of one or more processors. For example, the control unit 120 may be configured by a set of a communication control processor, an application processor, an Electronic Control Unit (ECU), a graphical processing unit, and a memory control processor. For another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 29:
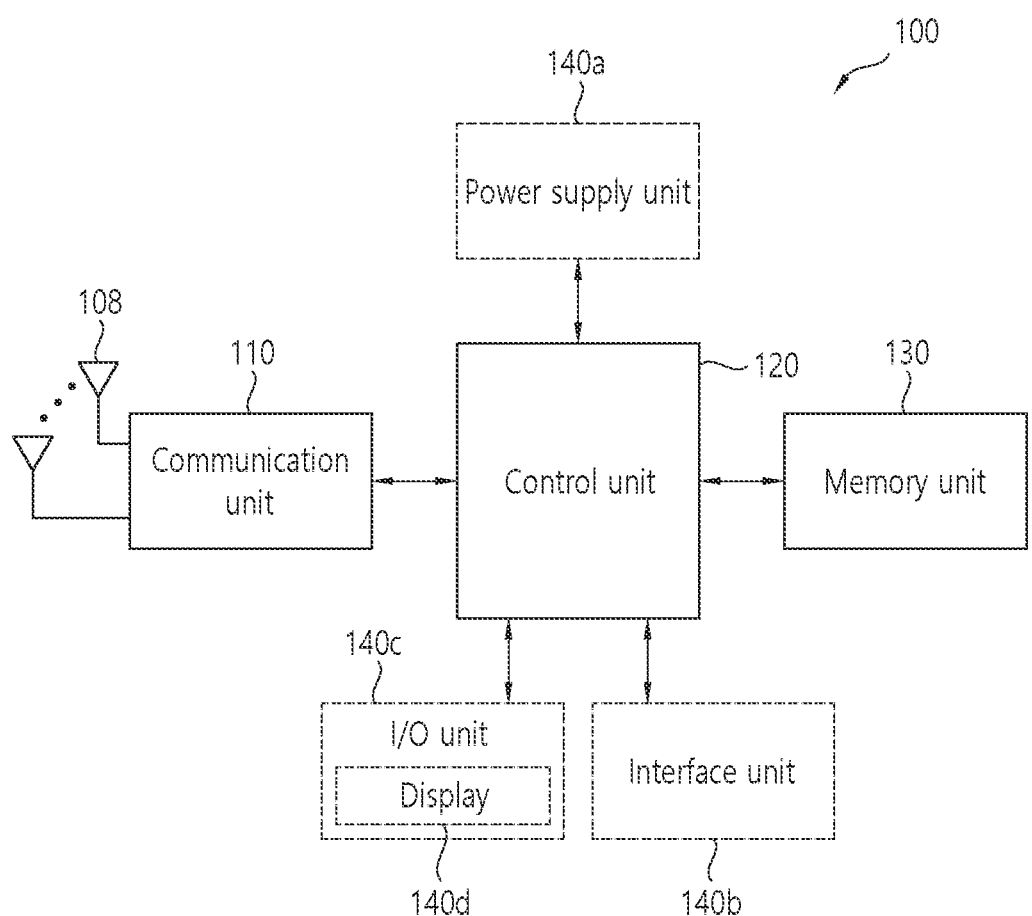
FIG. 29 illustrates a portable device applied to the present specification.

FIG. 29 illustrates a hand-held device applied to the present specification. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 29, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* respective correspond to the blocks 110 to 130/140 of FIG. 28.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

For example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 30:
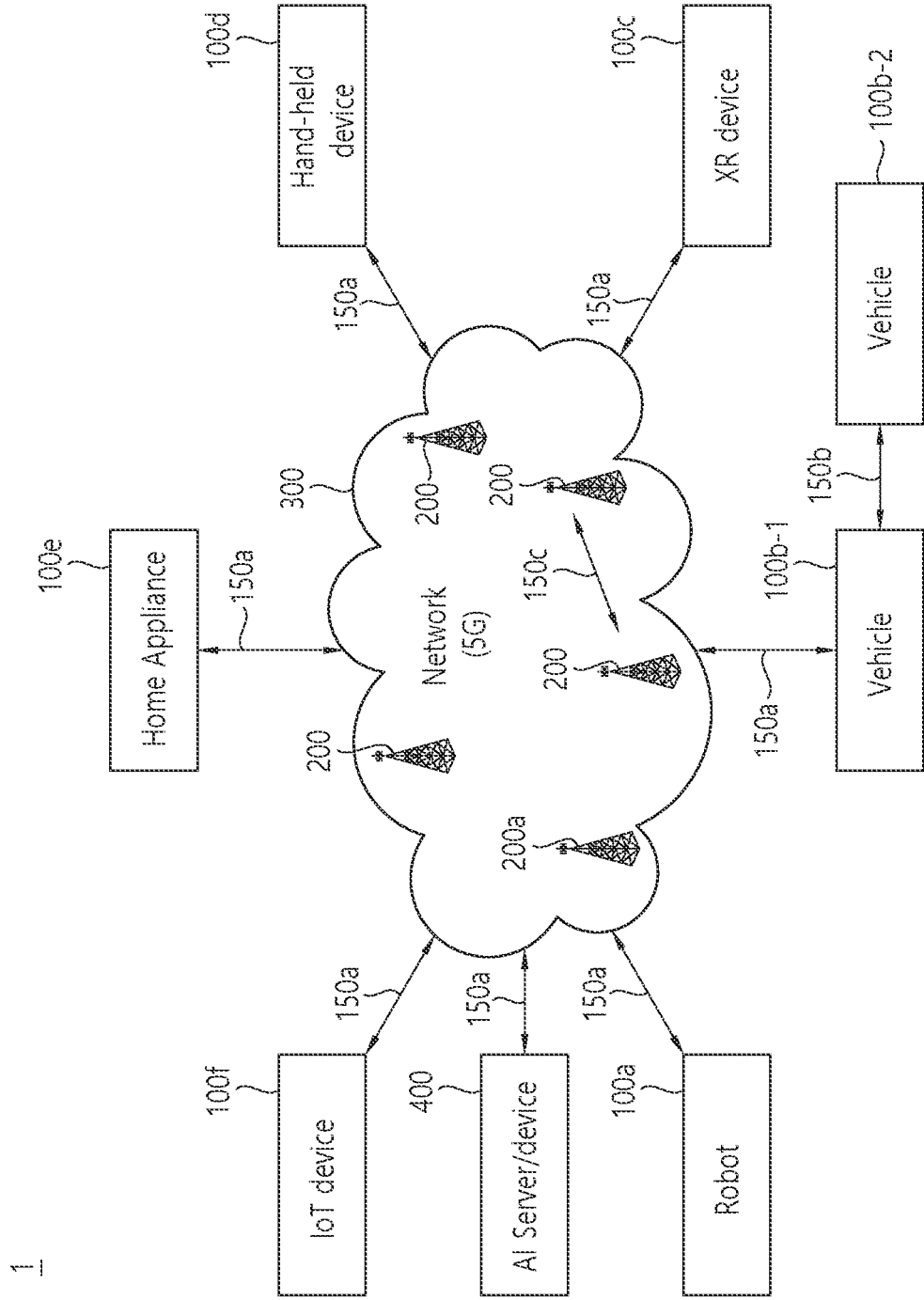
FIG. 30 illustrates the communication system 1 applied to this specification.

FIG. 30 illustrates a communication system 1 applied to the present specification.

Referring to FIG. 30, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Here, the wireless communication technology implemented in the wireless devices 100 and 200 of the present specification may include a narrowband Internet of Things for low-power communication as well as LTE, NR, and 6G. At this time, for example, NB-IoT technology may be an example of LPWAN (Low Power Wide Area Network) technology, and it may be implemented in standards such as LTE Cat NB1 and/or LTE Cat NB2, and is not limited to the above-described name. Additionally or alternatively, the wireless communication technology implemented in the wireless devices 100 and 200 of the present specification may perform communication based on the LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 100 and 200 of the present specification may include at least one of ZigBee, Bluetooth, and Low Power Wide Area Network (LPWAN) in consideration of low power communication, and is not limited to the above-mentioned names. For example, the ZigBee technology can create PAN (personal area networks) related to small/low-power digital communication based on various standards such as IEEE 802.15.4, and can be called by various names.

NR supports a plurality of numerologies (or a plurality of ranges of subcarrier spacing (SCS)) in order to support a variety of 5G services. For example, when SCS is 15 kHz, a wide area in traditional cellular bands is supported; when SCS is 30 kHz/60 kHz, a dense-urban, lower-latency, and wider-carrier bandwidth is supported; when SCS is 60 kHz or higher, a bandwidth greater than 24.25 GHz is supported to overcome phase noise.

NR frequency bands may be defined as frequency ranges of two types (FR1 and FR2). The values of the frequency ranges may be changed. For example, the frequency ranges of the two types (FR1 and FR2) may be as shown in Table 7. For convenience of description, FR1 of the frequency ranges used for an NR system may refer to a "sub 6 GHz range", and FR2 may refer to an "above 6 GHz range" and may be referred to as a millimeter wave (mmW).

TABLE 7

| Frequency range designation | Corresponding frequency range | Subcarrier spacing |
| --- | --- | --- |
| FR1 | 450 MHz-6000 MHz | 15, 30, 60 kHz |
| FR2 | 24250 MHz-52600 MHz | 60, 120, 240 kHz |

As illustrated above, the values of the frequency ranges for the NR system may be changed. For example, FR1 may include a band from 410 MHz to 7125 MHz as shown in Table 8. That is, FR1 may include a frequency band of 6 GHz (or 5850, 5900, 5925 MHz, or the like) or greater. For example, the frequency band of 6 GHz (or 5850, 5900, 5925 MHz, or the like) or greater included in FR1 may include an unlicensed band. The unlicensed bands may be used for a variety of purposes, for example, for vehicular communication (e.g., autonomous driving).

TABLE 8

| Frequency range designation | Corresponding frequency range | Subcarrier spacing |
| --- | --- | --- |
| FR1 | 410 MHz-7125 MHz | 15, 30, 60 kHz |
| FR2 | 24250 MHz-52600 MHz | 60, 120, 240 kHz |

FIG. 31 illustrates a vehicle or an autonomous driving vehicle applied to this specification. The vehicle or the autonomous driving vehicle may be configured as a mobile robot, a car, a train, a manned/unmanned aerial vehicle (AV), a ship, or the like.

Referring to FIG. 31, the vehicle or the autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. Blocks 110/130/140a to 140d correspond to the blocks 110/130/140 in FIG. 28, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140a may enable the vehicle or the autonomous driving vehicle 100 to run on the ground. The driving unit 140a may include an engine, a motor, a power train, wheels, a brake, a steering device, and the like. The power supply unit 140b supplies power to the vehicle or the autonomous driving vehicle 100 and may include a wired/wireless charging circuit, a battery, and the like. The sensor unit 140c may obtain a vehicle condition, environmental information, user information, and the like. The sensor unit 140c may include an inertial measurement unit (IMU) sensor, a collision sensor, a wheel sensor, a speed sensor, an inclination sensor, a weight sensor, a heading sensor, a position module, vehicular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140d may generate an autonomous driving route and a driving plan on the basis of obtained data. The control unit 120 may control the driving unit 140a to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140c may obtain a vehicle condition and environmental information. The autonomous driving unit 140d may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method for determining an application delay value of a minimum scheduling offset restriction in a wireless communication system, the method comprising:
    receiving downlink control information (DCI) including information for a change to a value of K0 min or K2 min in a slot n of a scheduling cell, wherein each of the K0 min and K2 min is an applied minimum scheduling offset restriction, and
    applying a changed K0 min or a changed K2 min value in a slot n+X of the scheduling cell,
    wherein the X value is a largest value among i) a first value obtained by multiplying currently applied K0 min (Y) in a scheduled cell scheduled by the DCI by $2^{\mu scheduling}/2^{\mu scheduled}$ and then performing ceiling and ii) a second value (Z) that are predetermined depending on a subcarrier spacing (SCS) of the scheduling cell, and
    wherein the µscheduling is a subcarrier spacing configuration of the scheduling cell and the µscheduled is a subcarrier spacing configuration of the scheduled cell.

2. The method of claim 1, wherein the DCI is received in symbols before a specific symbol index of the slot n.

3. The method of claim 1, wherein based on the DCI being received in symbols after a specific symbol index of the slot n, the second value (Z) is incremented by 1 and then the X value is determined.

4. The method of claim 1, wherein the X value is determined based on a following equation, $$X = \max\left(\left\lceil Y \cdot \frac{2^{\mu_{scheduling}}}{2^{\mu_{scheduled}}} \right\rceil, Z\right)$$

wherein the Y is a K0 min value currently applied to the scheduled cell, and the Z is the second value.

5. The method of claim 1, wherein based on a subcarrier spacing (SCS) of the scheduling cell being 15 kHz, 30 kHz, 60 kHz, 120 kHz, the second value (Z) is 1, 1, 2, 2, respectively.

6. The method of claim 1, wherein the slot n includes a total of 14 symbols in a time domain.

7. The method of claim 1, wherein the K0 min is a minimum scheduling offset restriction related to a minimum value of an offset between a slot for receiving a first DCI and a slot for receiving a physical downlink shared channel (PDSCH) scheduled by the first DCI, and wherein the K2 min is a minimum scheduling offset restriction related to a minimum value of an offset between a slot for receiving a second DCI and a slot for transmitting a physical uplink shared channel (PUSCH) scheduled by the second DCI.

8. A user equipment (UE) comprising:

a transceiver for transmitting and receiving a radio signal; and a processor operating in connected to the transceiver, wherein the processor is configured to:

receive downlink control information (DCI) including information for a change to a value of K0 min or K2 min in a slot n of a scheduling cell, wherein each of the K0 min and K2 min is an applied minimum scheduling offset restriction, and apply a changed K0 min or a changed K2 min value in a slot n+X of the scheduling cell, wherein the X value is a largest value among i) a first value obtained by multiplying currently applied K0 min (Y) in a scheduled cell scheduled by the DCI by $2^{\mu scheduling}/2^{\mu scheduled}$ and then performing ceiling and ii) a second value (Z) that are predetermined depending on a subcarrier spacing (SCS) of the scheduling cell, and wherein the $\mu$scheduling is a subcarrier spacing configuration of the scheduling cell and the $\mu$scheduled is a subcarrier spacing configuration of the scheduled cell.

9. The UE of claim 8, wherein the DCI is received in symbols before a specific symbol index of the slot n.

10. The UE of claim 8, wherein based on the DCI being received in symbols after a specific symbol index of the slot n, the second value (Z) is incremented by 1 and then the X value is determined.

11. The UE of claim 8, wherein the X value is determined based on a following equation, $$X = \max\left(\left\lceil Y \cdot \frac{2^{\mu scheduling}}{2^{\mu scheduled}} \right\rceil, Z\right)$$

wherein the Y is a K0 min value currently applied to the scheduled cell, and the Z is the second value.

12. The UE of claim 8, wherein based on a subcarrier spacing (SCS) of the scheduling cell being 15 kHz, 30 kHz, 60 kHz, 120 kHz, the second value (Z) is 1, 1, 2, 2, respectively.

13. The UE of claim 8, wherein the slot n includes a total of 14 symbols in a time domain.

14. The UE of claim 8, wherein the K0 min is a minimum scheduling offset restriction related to a minimum value of an offset between a slot for receiving a first DCI and a slot for receiving a physical downlink shared channel (PDSCH) scheduled by the first DCI, and wherein the K2 min is a minimum scheduling offset restriction related to a minimum value of an offset between a slot for receiving a second DCI and a slot for transmitting a physical uplink shared channel (PUSCH) scheduled by the second DCI.

15. A communication method of a base station to which an application delay value of a minimum scheduling offset restriction is applied in a wireless communication system, the method comprising:

transmitting, to a user equipment, downlink control information (DCI) including information for a change to a value of K0 min or K2 min in a slot n of a scheduling cell, wherein each of the K0 min and K2 min is an applied minimum scheduling offset restriction, and communicating with the user equipment by applying a changed K0 min or a changed K2 min value in a slot n+X of the scheduling cell, wherein the X value is a largest value among i) a first value obtained by multiplying currently applied K0 min (Y) in a scheduled cell scheduled by the DCI by $2^{\mu scheduling}/2^{\mu scheduled}$ and then performing ceiling and ii) a second value (Z) that are predetermined depending on a subcarrier spacing (SCS) of the scheduling cell, and wherein the $\mu$scheduling is a subcarrier spacing configuration of the scheduling cell and the $\mu$scheduled is a subcarrier spacing configuration of the scheduled cell.

\* \* \* \* \*